(12) United States Patent
Matsunaga et al.

(10) Patent No.: US 11,613,273 B2
(45) Date of Patent: Mar. 28, 2023

(54) PARKING ASSIST APPARATUS

(71) Applicants: TOYOTA JIDOSHA KABUSHIKI KAISHA, Toyota (JP); DENSO CORPORATION, Kariya (JP)

(72) Inventors: Yasutaka Matsunaga, Nisshin (JP); Toshihiro Takagi, Nisshin (JP); Satoshi Kozai, Toyota (JP); Masahiro Iino, Kariya (JP); Michihiro Takada, Kariya (JP); Yuusuke Nomura, Kariya (JP); Ryou Izumi, Kariya (JP); Mayuko Maeda, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 196 days.

(21) Appl. No.: 17/066,046

(22) Filed: Oct. 8, 2020

(65) Prior Publication Data
US 2021/0107511 A1   Apr. 15, 2021

(30) Foreign Application Priority Data

Oct. 11, 2019   (JP) .............................. JP2019-188212

(51) Int. Cl.
| | |
|---|---|
| B60W 30/06 | (2006.01) |
| B60R 1/00 | (2022.01) |
| B60W 60/00 | (2020.01) |
| G08G 1/14 | (2006.01) |
| B60W 50/14 | (2020.01) |

(52) U.S. Cl.
CPC ............. *B60W 60/001* (2020.02); *B60R 1/00* (2013.01); *B60W 30/06* (2013.01); *B60W 50/14* (2013.01); *G08G 1/143* (2013.01); *B60R 2300/105* (2013.01); *B60R 2300/20* (2013.01); *B60R 2300/304* (2013.01); *B60R 2300/607* (2013.01); *B60W 2050/146* (2013.01)

(58) Field of Classification Search
CPC ......... B60W 60/00; B60W 30/06; B60R 1/00; G06T 11/00; G08G 1/14
See application file for complete search history.

(56) References Cited

U.S. PATENT DOCUMENTS

| | | | | |
|---|---|---|---|---|
| 2007/0057816 A1* | 3/2007 | Sakakibara | ........ | B62D 15/0275 |
| | | | | 340/932.2 |
| 2018/0178724 A1 | 6/2018 | Hatakeyama et al. | | |
| 2018/0308275 A1* | 10/2018 | Fortmann | ............ | G05D 1/0094 |
| 2019/0160971 A1* | 5/2019 | Fukushima | ............. | B60L 53/37 |
| 2020/0082185 A1* | 3/2020 | Yamamoto | ............. | G06V 20/58 |

FOREIGN PATENT DOCUMENTS

| | | |
|---|---|---|
| JP | 2012-217000 A | 11/2012 |
| JP | 2014-141216 A | 8/2014 |
| JP | 2016-192772 A | 11/2016 |
| JP | 2018-107754 A | 7/2018 |

* cited by examiner

*Primary Examiner* — Tan Q Nguyen
(74) *Attorney, Agent, or Firm* — Sughrue Mion, PLLC

(57) ABSTRACT

A parking assist apparatus includes an ECU. The ECU displays a first left support image on a predetermined display area of a touch panel display section so that an entire area of a tentative target parking space is displayed within the predetermined display area, based on a relative position of the tentative target parking space with respect to a vehicle.

4 Claims, 15 Drawing Sheets

PARKING ASSIST APPARATUS

BACKGROUND

Field

The present disclosure relates to a parking assist apparatus configured to be capable of performing a parking control to let a vehicle move from a parking start position to a target parking space and set the vehicle in a parking state.

Description of the Related Art

A parking assist apparatus (hereinafter, referred to as a "conventional apparatus") disclosed in Japanese Patent Application Laid-Open (kokai) No. 2014-141216 is configured to display, on a display, a screen for setting (i.e., a setting screen of) a target parking space at which a vehicle is to be parked through an autonomous parking control. The setting screen includes a bird's-eye view image (an overhead view image) viewed from a viewpoint immediately above the vehicle, a parking space setting frame that is superimposed on a parking space within the bird's-eye view image, and a vehicle icon (i.e., a drawn picture representing the vehicle). In addition, a camera viewpoint image of a front camera or a rear camera is displayed next to the setting screen on the display.

The parking space setting frame is displayed so as to allow a user (e.g., a driver) of the vehicle to set the target parking space. The conventional apparatus moves the parking space setting frame within the bird's-eye view image in accordance with a movement (a position) of the vehicle.

The user superimposes the parking space setting frame on the parking space at which the user wants to park the vehicle through the autonomous parking control, to thereby be able to select the parking space on which the parking space setting frame is superimposed as the target parking space. In addition, the user operates a position adjustment button in a state where the vehicle is stopped so as to finely adjust a position of the parking space setting frame. Thereby, the user can finely adjust the position of the target parking space.

However, according to the conventional apparatus, when the vehicle is at a parking start position, the target parking space at which the vehicle is to be parked through the autonomous parking control is not displayed largely on each of the setting screen and the camera viewpoint image that are both displayed on the display (refer to FIG. 9 of Japanese Patent Application Laid-Open (kokai) No. 2014-141216). Therefore, the conventional apparatus may not be able to provide a satisfactory function to assist the user to monitor the target parking space.

SUMMARY

The present disclosure has been made in order to cope with the above-described problem. That is, an object of the present disclosure is to provide a parking assist apparatus that can offer an improved function to assist a user of a vehicle to monitor a target parking space at which a vehicle is to be parked through an autonomous parking control. Hereinafter, the parking assist apparatus according to the present disclosure is sometimes referred to as the "present disclosed parking assist apparatus".

The present disclosed parking assist apparatus (10) is installed on a vehicle (100) and configured to be capable of performing an autonomous parking control to move the vehicle from a parking start position to a final target parking space so that the vehicle is parked in the final target parking space.

The present disclosed parking assist apparatus comprises:
a camera device (40) configured to capture images around the vehicle to obtain image information;
a display (60); and
a control unit (90) configured to:
specify, based on the image information, one or more of parking possible spaces each of which is a space to which the vehicle can be moved to be parked from the parking start position owing to the autonomous parking control;
produce a virtual viewpoint image of surroundings of the vehicle viewed from a virtual viewpoint located obliquely above the vehicle, based on the image information; and
display, on a first predetermined image display area of the display, a first surrounding image that includes the virtual viewpoint image and a first target parking space frame in such a manner that the first target parking space frame is superimposed on a tentative target parking space within the virtual viewpoint image, the tentative target parking space being one of the parking possible spaces that has been tentatively selected as the final target parking space,
wherein,
the control unit is configured to specify the virtual viewpoint for producing the virtual viewpoint image from predetermined virtual viewpoints, based on a relative position of the tentative target parking space with respect to the vehicle, so that an entire area of the tentative target parking space is displayed within the first predetermined image display area.
(refer to step 1215).

According to the present disclosed parking assist apparatus, it can cause a user to recognize a target parking space (the tentative target parking space) and the target parking space frame (the first target parking space frame) easily and clearly.

Therefore, the present disclosed parking assist apparatus can improve a function to assist the user of the vehicle to monitor the target parking space at which the vehicle is to be parked through the autonomous parking control.

In addition, it can display vehicle blind spots due to pillars and doors of the vehicle and the user to check presence or absence of obstacles around the vehicle. Therefore, the present disclosed parking assist apparatus can further improve the function to assist the user of the vehicle to monitor the target parking space (the tentative target parking space) at which the vehicle is to be parked through the autonomous parking control.

In one of embodiments,
the control unit is configured to:
have stored the predetermined virtual viewpoints that are allocated to a plurality of respective ranges around the vehicle in advance;
determine which of the ranges the tentative target parking space belongs to; and
change the virtual viewpoint for producing the virtual viewpoint image based on the determined range (refer to step 1325), when range to which the tentative target parking space belongs changes (refer to a "Yes" determination at step 1315).

According to the above embodiment, even after the tentative target parking space has changed to another parking possible space, it can cause the user to recognize the target parking space (the tentative target parking space) and the target parking space frame (the first target parking space frame) clearly. Therefore, the above embodiment can improve the function to assist the user of the vehicle to monitor the target parking space (the tentative target parking space) at which the vehicle is to be parked through the autonomous parking control.

In one of embodiments,
the control unit is configured to:
when the range to which the tentative target parking space belongs changes from a first range to a second range, produce a moving image composed of consecutive virtual viewpoint images that are displayed consecutively in time, wherein each of the consecutive virtual viewpoint images correspond to respective virtual viewpoints that move consecutively in time along a predetermined path from one of the predetermined virtual viewpoints stored in advance and allocated to the first range to another of one of the predetermined virtual viewpoints stored in advance and allocated to the second range; and
display the moving image in a period from a time point at which the virtual viewpoint image corresponding to the first range is deleted to a time point at which the virtual viewpoint image corresponding to the second range starts to be displayed.

According to the above embodiment, it can cause the user to recognize the target parking space (the tentative target parking space) and the target parking space frame (the first target parking space frame) even after the tentative target parking space has changed to another tentative parking space. Therefore, the above embodiment can further improve the function to assist the user of the vehicle to monitor the target parking space (the tentative target parking space) at which the vehicle is to be parked through the autonomous parking control.

In one of embodiments,
the control unit is configured to:
further produce a bird's-eye view image of surroundings of the vehicle viewed from a virtual viewpoint located immediately above the vehicle, based on the image information;
display, on a second predetermined image display area of the display, a second surrounding image that includes the bird's-eye view image and a second target parking space frame in such a manner that the second target parking space frame is superimposed on the tentative target parking space within the bird's-eye view image; and
when the tentative target parking space is switched to from one of the target parking possible spaces to another of the target parking possible spaces, execute a display change control to:
produce the bird's-eye view image so that a center position of the vehicle is located at a center in a width direction of the bird's-eye view image; and
shift the center of the bird's-eye view image in the width direction of the bird's-eye view image based on the relative position so that the tentative target parking space is displayed more largely (refer to step 1525).

According to the above embodiment, even when the target parking space (the tentative target parking space) and the target parking space frame (the second target parking space frame) are far from the vehicle, at least part of them appear larger on the display. Therefore, the above embodiment can further improve the function to assist the user of the vehicle to monitor the target parking space (the tentative target parking space) at which the vehicle is to be parked through the autonomous parking control.

In one of embodiments,
the control unit is configured to be capable of performing any one of a memory autonomous parking mode and a normal autonomous parking mode selectively, as an autonomous parking mode that allows the control unit to perform the autonomous parking control; and
wherein,
the control unit is configured to be capable of executing the display change control when the autonomous parking mode is the memory autonomous parking mode (refer to step 1525).

According to the above embodiment, in the memory autonomous parking mode where a position far from the parking start position is highly likely to become a position of the target parking space (the tentative target parking space), it can further improve the function to assist the user of the vehicle to monitor the target parking space (the tentative target parking space) at which the vehicle is to be parked through the autonomous parking control.

In one of embodiments,
the control unit is configured to execute the display change control when the autonomous parking mode changes from the normal autonomous parking mode to the memory autonomous parking mode (refer to steps 1515 and 1525).

According to the above embodiment, even when the autonomous parking mode has changed to the memory autonomous parking mode, it can further improve the function to assist the user of the vehicle to monitor the target parking space (the tentative target parking space) at which the vehicle is to be parked through the autonomous parking control.

In one of embodiments,
the control unit is configured to:
produce a moving image composed of consecutive bird's-eye view images that are displayed consecutively in time; and
intervene the moving image between the second surrounding image before the execution of the display change control and the second surrounding image after the execution of the display change control.

According to the above embodiment, it can cause the user to recognize the target parking space (the tentative target parking space) more easily even after the tentative target parking space has changed to another parking possible space. Therefore, the above embodiment can further improve the function to assist the user of the vehicle to monitor the target parking space (the tentative target parking space) at which the vehicle is to be parked through the autonomous parking control.

The present disclosed parking assist apparatus (10) is installed on a vehicle (100) and configured to be capable of performing an autonomous parking control to move the vehicle from a parking start position to a final target parking space so that the vehicle is parked in the final target parking space.

The present disclosed parking assist apparatus comprises:
a camera device (40) configured to capture images around the vehicle to obtain image information;
a display (60); and
a control unit (90) configured to:
specify, based on the image information, one or more of parking possible spaces each of which is a space to which the vehicle can be moved to be parked from the parking start position owing to the autonomous parking control;

produce a bird's-eye view image of surroundings of the vehicle viewed from a virtual viewpoint located immediately above the vehicle, based on the image information;

display, on a predetermined image display area of the display, a surrounding image that includes the bird's-eye view image and a target parking space frame in such a manner that the target parking space frame is superimposed on a tentative target parking space within the bird's-eye view image, the tentative target parking space being one of the parking possible spaces that has been tentatively selected as the final target parking space;

produce the bird's-eye view image so that a center position of the vehicle is located at a center in a width direction of the bird's-eye view image; and shift the center of the bird's-eye view image in an opposite direction to a direction to which the tentative target parking space is present and in the width direction, based on the relative position, so that the tentative target parking space is displayed more largely (refer to step 1415).

Notably, in the above description, in order to facilitate understanding of the present disclosure, the constituent elements or parameters of the disclosure corresponding to those of an embodiment of the disclosure which will be described later are accompanied by parenthesized names and/or symbols which are used in the embodiment. However, the constituent elements or parameters of the present disclosure are not limited to those in the embodiment defined by the names and/or the symbols. Other objects, other features, and attendant advantages of the present disclosure will be readily appreciated from the following description of the embodiment of the disclosure which is made with reference to the accompanying drawings.

DESCRIPTION OF THE PREFERRED EMBODIMENTS

<Configuration>

Figure 1:
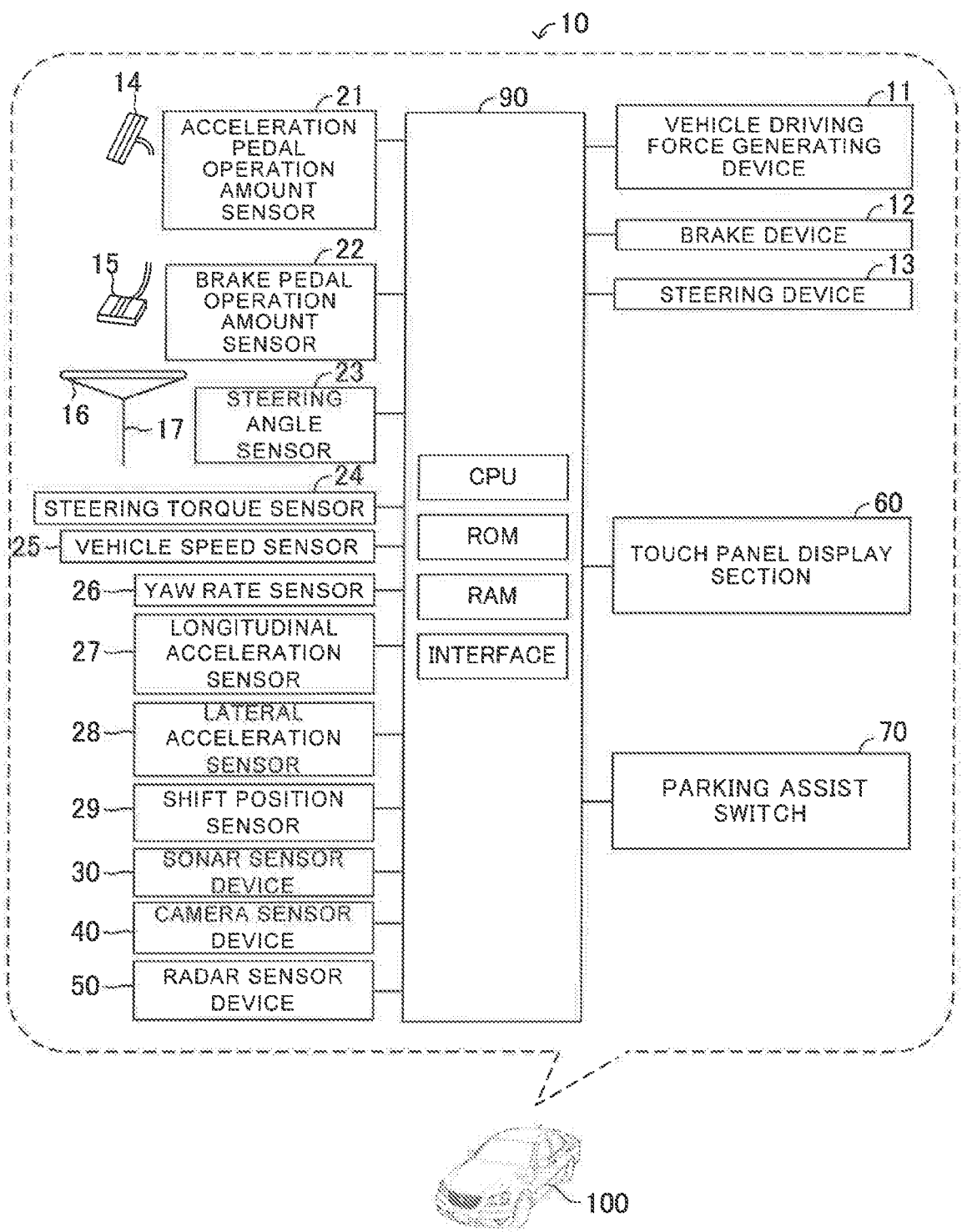
FIG. 1 is a schematic diagram of a parking assist apparatus according to an embodiment of the present disclosure and a vehicle to which the parking assist apparatus is applied.

A parking assist apparatus 10 for a vehicle 100 according to an embodiment of the present disclosure will next be described with reference to the drawings. FIG. 1 illustrates the parking assist apparatus 10 and the vehicle 100 to which the parking assist apparatus 10 is applied.

As shown in FIG. 1, the parking assist apparatus 10 includes an ECU 90. The ECU is an abbreviation of an "Electronic Control Unit" which is a controller. The ECU 90 includes, as a main component, a microcomputer having a CPU, a ROM, a RAM, a nonvolatile memory, and an interface I/F. The CPU achieves various functions through executing instructions, programs or routines, stored in the ROM. The ECU 90 may be separated into a plurality of ECUs that cooperate with each other.

The vehicle 100 is equipped with a vehicle driving force generating device 11, a brake device 12, and a steering device 13. The vehicle driving force generating device 11 is configured to generate a driving force to drive the vehicle 100 and to transmit the driving force to drive wheels of the vehicle 100. The vehicle driving force generating device 11 includes, for instance, an internal combustion engine, and a motor. The brake device 12 is configured to apply a brake force to wheels of the vehicle 100. The steering device 13 is configured to generate a steering torque to steer the vehicle 100 and to apply the steering torque to steered wheels of the vehicle 100.

The ECU 90 is electrically connected with the vehicle driving force generating device 11, the brake device 12, and the steering device 13. The ECU 90 is configured to control the vehicle driving force generating device 11 so as to control the driving force applied to the drive wheels. The ECU 90 is configured to control the brake device 12 so as to control the brake force applied to the wheels. The ECU 90 is configured to control the steering device 13 so as to control the steering torque applied to the steered wheels.

The parking assist apparatus 10 comprises an acceleration pedal operation amount sensor 21, a brake pedal operation amount sensor 22, a steering angle sensor 23, a steering torque sensor 24, a vehicle speed sensor 25, a yaw rate sensor 26, a longitudinal acceleration sensor 27, a lateral acceleration sensor 28, a shift position sensor 29, a sonar sensor device 30, a camera sensor device (camera device) 40, a radar sensor device 50, a touch panel display section 60, and a parking assist switch 70.

The acceleration pedal operation amount sensor 21 is electrically connected with the ECU 90 and is configured to output a signal indicative of an acceleration pedal operation amount AP. The ECU 90 is configured to obtain the acceleration pedal operation amount AP based on the signal of the acceleration pedal operation amount sensor 21. The ECU 90 is configured to control the vehicle driving force generating device 11 based on the obtained acceleration pedal operation amount AP in such a manner that the driving force applied to the drive wheels is varied based on the obtained acceleration pedal operation amount AP.

The brake pedal operation amount sensor 22 is electrically connected with the ECU 90 and is configured to output a signal indicative of a brake pedal operation amount BP. The ECU 90 is configured to obtain the brake pedal operation amount BP based on the signal of the brake pedal operation amount sensor 22. The ECU 90 is configured to control the brake device 12 based on the obtained brake pedal operation amount BP in such a manner that the brake force applied to the wheels of the vehicle 100 is varied based on the obtained brake pedal operation amount BP.

The steering angle sensor 23 is electrically connected with the ECU 90 and is configured to output a signal indicative of a rotation angle θst with respect to a neutral position of a steering wheel 16. The ECU 90 is configured to obtain the rotation angle t as a steering angle θst, based on the signal of the steering angle sensor 23.

The steering torque sensor 24 is electrically connected with the ECU 90 and is configured to output a signal indicative of a torque TQst input by the user to the steering shaft 17. The ECU 90 is configured to obtain the torque TQst as a steering torque TQst based on the signal of the steering torque sensor 24.

The ECU 90 is configured to control the steering device 13 based on the obtained steering angle θst and the obtained steering torque TQst in such a manner that the steering torque applied to the steered wheels is varied based on the obtained steering angle θst and the obtained steering torque TQst.

The vehicle speed sensor 25 is electrically connected with the ECU 90 and is configured to output a signal indicative of a rotational speed Vrot of each of the wheels of the vehicle 100. The ECU 90 is configured to obtain the rotational speed Vrot of each of the wheels based on the signal of the vehicle speed sensor 25, and to obtain a vehicle speed SPD which is a running speed of the vehicle 100 based on the obtained rotational speed Vrot of each of the wheels.

The yaw rate sensor 26 is electrically connected with the ECU 90 and is configured to output a signal indicative of a yaw rate YR of the vehicle 100. The ECU 90 is configured to obtain the yaw rate YR of the vehicle 100 based on the signal of the yaw rate sensor 26.

The longitudinal acceleration sensor 27 is electrically connected with the ECU 90 and is configured to output a signal indicative of a longitudinal acceleration Gx of the vehicle 100. The ECU 90 is configured to obtain the longitudinal acceleration Gx of the vehicle 100 based on the signal of the longitudinal acceleration sensor 27.

The lateral acceleration sensor 28 is electrically connected with the ECU 90 and is configured to output a signal indicative of a lateral acceleration Gy of the vehicle 100. The ECU 90 is configured to obtain the lateral acceleration Gy of the vehicle 100 based on the signal of the lateral acceleration sensor 28.

The shift position sensor 29 is electrically connected with the ECU 90 and is configured to output a signal indicative of a position of an unillustrated shift lever. The position of the shift lever is a parking position (P), a forward position (D), or a reverse position (R). The ECU 90 is configured to obtain the shift lever position based on the signal of the shift position sensor 29, and to control an unillustrated transmission and/or drive direction changing mechanism, based on the obtained shift lever position. Namely, the ECU 90 is configured to perform a shift control. In addition, the ECU 90 is configured to be capable of controlling the transmission and/or the drive direction changing mechanism as well as the position of the shift lever, regardless of the user's operation to the shift lever.

The sonar sensor device 30 comprises a first clearance sonar 301 to a twelfth clearance sonar 312. Hereinafter, the first clearance sonar 301 to the twelfth clearance sonar 312 may sometimes be collectively referred to as clearance sonars 313, as appropriate.

Figure 2:
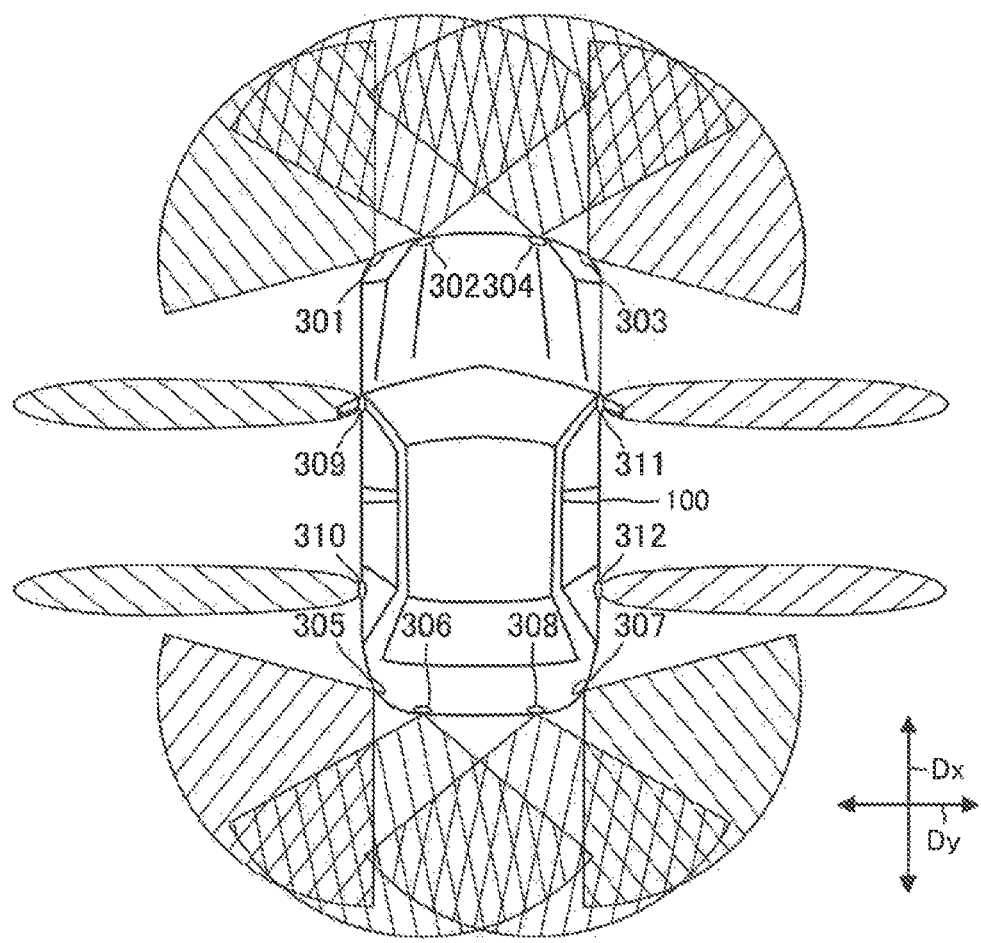
FIG. 2 is a figure illustrating positions of sonar sensors and their detection areas.

As shown in FIG. 2, the first clearance sonar 301 is fixed to the vehicle 100 so as to radiate ultrasonic wave along a front left direction from a front left end part of the vehicle 100.

The second clearance sonar 302 is fixed to the vehicle 100 so as to radiate ultrasonic wave along a front direction from a front end on the left side of the vehicle 100.

The third clearance sonar 303 is fixed to the vehicle 100 so as to radiate ultrasonic wave along a front right direction from a front right end part of the vehicle 100.

The fourth clearance sonar 304 is fixed to the vehicle 100 so as to radiate ultrasonic wave along the front direction from the front end on the right side of the vehicle 100.

The fifth clearance sonar 305 is fixed to the vehicle 100 so as to radiate ultrasonic wave along a rear left direction from a rear left end part of the vehicle 100.

The sixth clearance sonar 306 is fixed to the vehicle 100 so as to radiate ultrasonic wave along a rear direction from a rear end on the left side of the vehicle 100.

The seventh clearance sonar 307 is fixed to the vehicle 100 so as to radiate ultrasonic wave along a rear right direction from a rear right end part of the vehicle 100.

The eighth clearance sonar 308 is fixed to the vehicle 100 so as to radiate ultrasonic wave along the rear direction from the rear end on the right side of the vehicle 100.

The ninth clearance sonar 309 is fixed to the vehicle 100 so as to radiate ultrasonic wave along a left direction from a front left part of the vehicle 100.

The tenth clearance sonar 310 is fixed to the vehicle 100 so as to radiate ultrasonic wave along the left direction from a rear left part of the vehicle 100.

The eleventh clearance sonar 311 is fixed to the vehicle 100 so as to radiate ultrasonic wave along a right direction from a front right part of the vehicle 100.

The twelfth clearance sonar 312 is fixed to the vehicle 100 so as to radiate ultrasonic wave along the right direction from a rear right part of the vehicle 100.

Each of the clearance sonars 313 is configured to receive ultrasonic wave that is reflected from an object.

The sonar sensor device 30 is electrically connected with the ECU 90. The sonar sensor device 30 is configured to transmit, to the ECU 90, information on ultrasonic wave that the clearance sonars 313 radiate and the ultrasonic wave that the clearance sonars 313 receive. The ECU 90 is configured to obtain information on an object present in the vicinity of (or around) the vehicle 100 as "sonar object information", based on the information sent from the sonar sensor device 30.

In FIG. 2, the direction indicated by a reference Dx is a longitudinal (or front-rear) direction of the vehicle 100, and is referred to as a "vehicle longitudinal direction Dx", hereinafter. In FIG. 2, the direction indicated by a reference Dy is a lateral (or width) direction of the vehicle 100, and is referred to as a "vehicle width direction Dy", hereinafter.

The camera sensor device 40 comprises a front camera 41, a rear camera 42, a left camera 43, and a right camera 44. Hereinafter, the front camera 41, the rear camera 42, the left camera 43, and the right camera 44 may sometimes be collectively referred to as "cameras 45", as appropriate.

Figure 3:
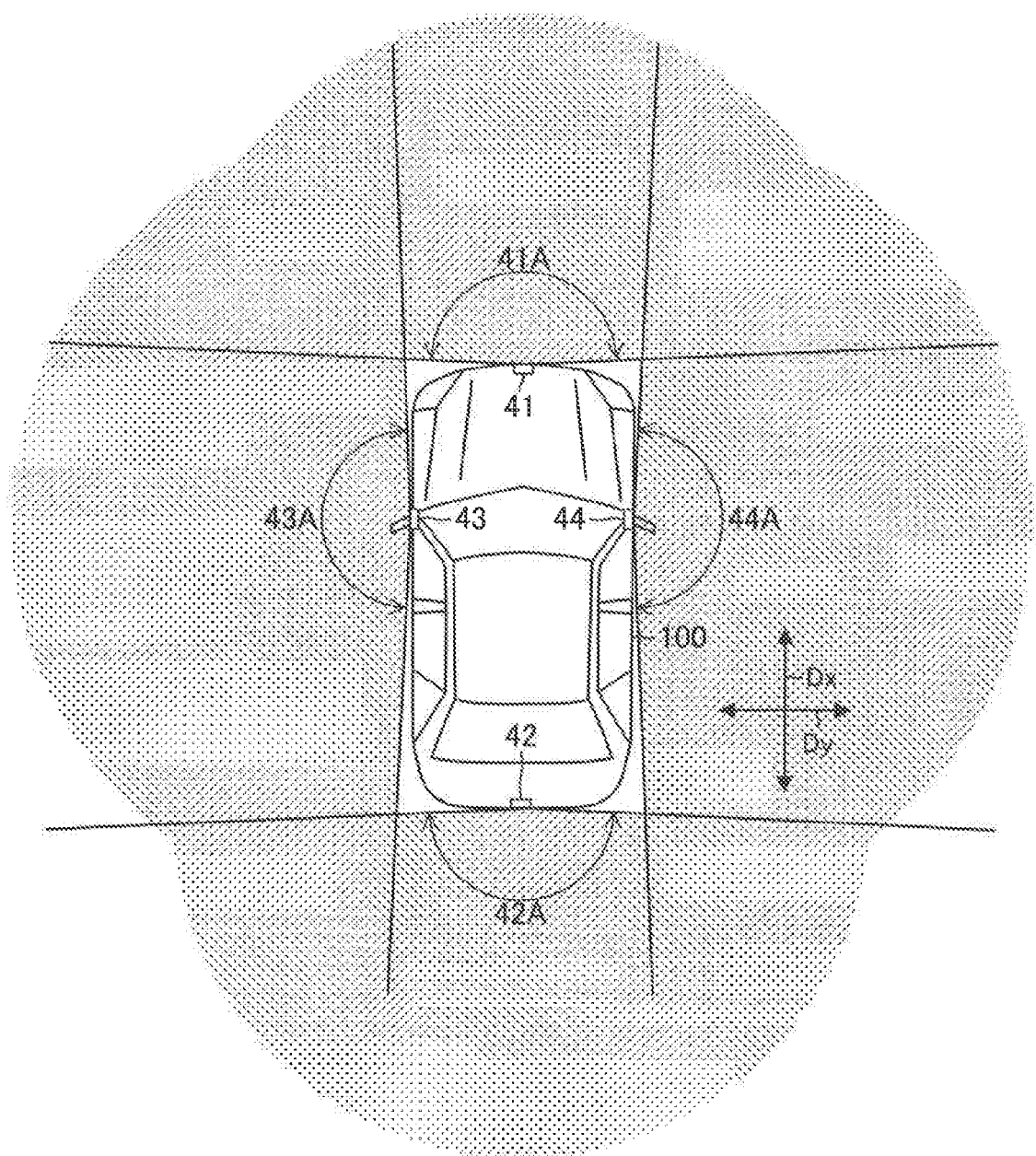
FIG. 3 is a figure illustrating positions of camera sensors and their imaging areas.

As shown in FIG. 3, the front camera 41 is fixed to a front end center part of the vehicle 100 so as to photograph (or capture an image of) a scene in front of the vehicle 100. An angle 41A of view of the front camera 41 is about 180 degrees.

The rear camera 42 is fixed to a rear end center part of the vehicle 100 so as to photograph (or capture an image of) a scene behind the vehicle 100. An angle 42A of view of the rear camera 42 is also about 180 degrees.

The left camera 43 is fixed to a left side part of the vehicle 100 so as to photograph (or capture an image of) a scene on the left of the vehicle 100. An angle 43A of view of the left camera 43 is also about 180 degrees.

The right camera 44 is fixed to a right side part of the vehicle 100 so as to photograph (or capture an image of) a scene on the right of the vehicle 100. An angle 44A of view of the right camera 44 is also about 180 degrees.

The camera sensor device 40 is electrically connected with the ECU 90. The ECU 90 is configured to obtain information on the images of the scenes taken by the cameras 45 through the camera sensor device 40.

The information on the image of the scene taken by the front camera 41 may be referred to as "front image information IMG1", as appropriate.

The information on the image of the scene taken by the rear camera 42 may be referred to as "rear image information IMG2", as appropriate.

The information on the image of the scene taken by the left camera 43 may be referred to as "left image information IMG3", as appropriate.

The information on the image of the scene taken by the right camera 44 may be referred to as "right image information IMG4", as appropriate.

Hereinafter, the front image information IMG1, the rear image information IMG2, the left image information IMG3, and the right image information IMG4 may be collectively referred to as "image information IMG", as appropriate.

The ECU 90 produces/generates surrounding image information using (or based on) the front image information IMG1, the rear image information IMG2, the left image information IMG3, and the right image information IMG4, every time a predetermined time elapses. A screen displayed (or produced) based on the surrounding image information is referred to as a surrounding image (or image of surroundings of the vehicle 100, surrounding image screen). The surrounding image is an image that corresponds to at least a part of area around the vehicle 100 and includes a camera viewpoint image and synthetic images.

The camera viewpoint image is an image viewed from a position of a lens of each of the cameras 45.

One of the synthetic images is an image of the vicinity of the vehicle 100 viewed from a virtual viewpoint placed at an arbitrary position around the vehicle 100 in a virtual space (a virtual three dimensional space). The image of the vicinity of the vehicle 100 viewed from a virtual viewpoint placed at the arbitrary position around the vehicle 100 is referred to as a "virtual viewpoint image".

The virtual viewpoint image can be produced based on various well-known methods (refer to Japanese Patent Application Laid-Open (kokai) Nos. 2012-217000, 2016-192772, and 2018-107754). The ECU 90 may produce/generate an image having the camera viewpoint image and/or the virtual viewpoint image. A vehicle image (e.g., a first vehicle polygon (a symbolic image) SP1 or a second vehicle polygon (a symbolic image) SP2) representing a shape of the vehicle 100, a figure image including a line for supporting the parking operation, and a character image including a message for supporting the parking operation are superimposed on the camera viewpoint image and/or the virtual viewpoint image. This type of image may also be referred to as the surrounding image.

One of the methods for producing virtual viewpoint image information from which the virtual viewpoint image is created/produced will be briefly described. The ECU 90 projects "pixels (or picture elements) included in the front image information IMG1, the rear image information IMG2, the left image information IMG3, and the right image information IMG4" onto a predetermined curved projection surface (e.g., a bowl-like surface or a hemispheric dome-like surface) in a virtual three dimensional space (3D space).

A center part of the curved projection surface is regarded as (a location of) the vehicle 100. Apart of the curved projection surface other than the center part corresponds to the front image information IMG1, the rear image information IMG2, the left image information IMG3, and the right image information IMG4. The ECU 90 projects "the pixels included in the front image information IMG1, the rear image information IMG2, the left image information IMG3, and the right image information IMG4" onto the part of the curved projection surface other than the center part.

The ECU 90 places the "vehicle polygon representing the shape of the vehicle 100" at the center of the curved projection surface. The ECU 90 sets/places a virtual viewpoint in the virtual 3D space, and cuts out, as image information (or image), an "area of the curved projection surface" that is covered/encompassed part of the curved projection surface" within a predetermined view angle from the virtual viewpoint. The ECU 90 superimposes the vehicle polygon (the first vehicle polygon SP1 or the second vehicle polygon SP2) representing the shape of the vehicle 100 present within the predetermined view angle from the virtual viewpoint on the cut out image information (image). In this manner, the virtual viewpoint image information is produced.

The radar sensor device 50 comprises a first radar sensor 51a to a fifth radar sensor 51e. Hereinafter, each of the first radar sensor 51a to the fifth radar sensor 51e sometimes be collectively referred to as a "radar sensor 51", as appropriate.

The radar sensor 51 is a well-known sensor using a millimeter waveband electric wave. The radar sensor 51 is configured to obtain radar sensor object information and transmit the obtained radar sensor object information to the ECU 90. The radar sensor object information is information that can specify a distance between a three dimension object (hereinafter, referred to as a "3D object") and the vehicle 100, a relative speed between the 3D object and the vehicle 100, a relative position (direction) of the 3D object with respect to the vehicle 100.

Figure 4:
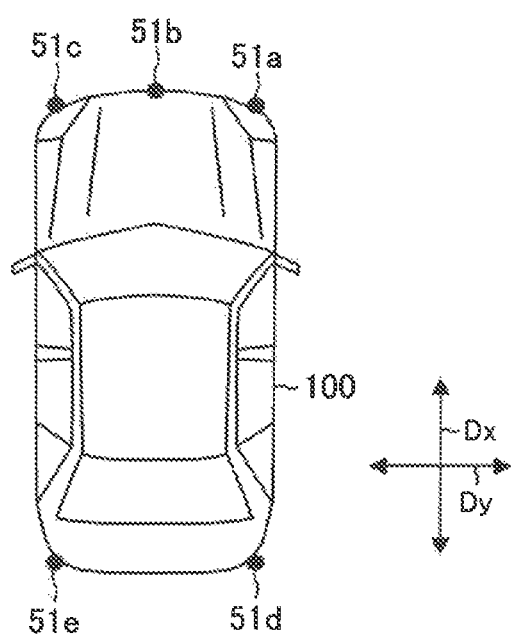
FIG. 4 is a figure illustrating positions of radar sensors.

As shown in FIG. 4, the radar sensor 51 (51a to 51e) is arranged at respective position of the vehicle 100 so as to obtain the radar sensor object information on the 3D object present in respective area, as described below.

The radar sensor 51a is configured to obtain the radar sensor object information on the 3D object present in a front right area of the vehicle 100 (an area ahead of the vehicle 100 on the right).

The radar sensor 51b is configured to obtain the radar sensor object information on the 3D object present in a front area of the vehicle 100 (an area ahead of the vehicle 100).

The radar sensor 51c is configured to obtain the radar sensor object information on the 3D object present in a front left area of the vehicle 100 (an area ahead of the vehicle 100 on the left).

The radar sensor 51d is configured to obtain the radar sensor object information on the 3D object present in a rear right area of the vehicle 100 (an area behind the vehicle 100 on the right).

The radar sensor 51e is configured to obtain the radar sensor object information on the 3D object present in a rear left area of the vehicle 100 (an area behind the vehicle 100 on the left).

The touch panel display section 60 is arranged at a position of the vehicle 100 so as to be seen by (or be visible to) the user. In the present example, the touch panel display section 60 is a touch panel type display of a so-called navigation system.

The touch panel display section 60 is electrically connected with the ECU 90. The ECU 90 lets/has the touch panel display section 60 display various images (e.g., screen image (hereinafter, simply referred to as a "screen") including the above described surrounding image).

The parking assist switch 70 is a switch operated (or pressed) by the user.

<Outline of Parking Assist Function>

The ECU 90 provides a parking assist function to the vehicle 100. The parking assist function includes a function to autonomously drive the vehicle 100 when parking or departing (entering or leaving the parking space) of the vehicle 100 and/or a function to display a support screen for assisting the user of the vehicle 100 to park the vehicle 100 (move the vehicle 100 into the parking space) or to take the vehicle 100 out of the parking space so as to support the user's driving operation (i.e., the user's parking operation to the parking space and/or the user's taking-out operation from the parking space). The parking assist function includes a normal parking assist function and a memory parking assist function (may also be referred to as a "memory autonomous parking function").

(Normal Parking Assist Function)

The normal parking assist function is a function to autonomously park the vehicle 100 to/at a parking possible space that has been recognized by the ECU 90 when the vehicle is stopped at a parking start position (a parking start point). The ECU 90 specifies/detects the parking possible space based on compartment lines PL around the vehicle 100 and detection results of the 3D object(s). The ECU 90 is configured to execute a "detecting of parking possible space process", a "screen display control", and an "autonomous parking control", described below, in order to realize/perform the normal parking assist function. The autonomous parking control is a control to let the vehicle 100 move from the parking start position to a target parking space autonomously and set the vehicle 100 in a parking state.

(Detecting of Parking Possible Space Process)

The ECU 90 is configured to execute the "detecting of parking possible space process" when the vehicle speed SPD is equal to or lower than a vehicle speed threshold. The vehicle speed threshold has been set at a vehicle speed higher than the typical highest speed of the vehicle 100 while the vehicle 100 is being parked, and is, for instance, 16 km/h.

The ECU 90 receives the sonar object information from the clearance sonars 313 and the radar sensor object information form the radar sensors 51, every time a predetermined time elapses. The ECU 90 plots positions of the 3D objects based on the sonar object information and the radar sensor object information, on a two dimensional map (i.e., a two dimensional coordinate system). The two dimensional map corresponds to a plan view of a surrounding of the vehicle 100, wherein an origin of the map is a position of the vehicle 100 (e.g., a center position between the front left wheel and the front right wheel in a plan view), an X axis corresponds to a moving direction (or a front-rear direction) of the vehicle 100, and a Y axis corresponds to a left-right direction (or a width direction) of the vehicle 100.

The ECU 90 obtains the image information IMG (or image data) from the cameras 45, every time a predetermined time elapses. The ECU 90 analyzes the image information IMG and detects 3D object present around (or in the vicinity of) the vehicle 100 to specify the position (distance and direction) of the detected 3D object with respect to the vehicle 100 and the shape of the detected 3D object.

The ECU 90 detects road lines painted on a road surface around the vehicle 100 such as a lane marker(s) for defining a lane and a line(s) (i.e., compartment lines) defining parking space frame for a parking space, based on the surrounding image information. Furthermore, the ECU 90 specifies a position (distance and direction) of the detected road line with respect to the vehicle 100 and a shape of the detected road line. Thereafter, the ECU 90 plots/draws the detected/specified 3D objects and the detected/specified road lines on the above described two dimensional map.

The ECU 90 recognizes the 3D objects around the vehicle 100 and detects a "space where there is no 3D object" around the vehicle 100, based on the information on the two dimensional map. The ECU 90 determines whether or not the space where there is no 3D object is large enough for parking the vehicle 100 (with sufficient margin) in a viewpoint of a scale and a shape of the space. When the space where there is no 3D object is determined to be large enough for parking of the vehicle 100, the ECU 90 determines/recognize/regards that space as the "parking possible space/spot". For instance, the parking possible space is a space between two road lines adjacent to and parallel to each other or a space between two 3D objects adjacent to and parallel to each other. The parking possible space is typically rectangular and has a shape larger than the plane shape of the vehicle 100 to accommodate the vehicle 100.

The ECU 90 determines which the determined parking possible space is, a space (hereinafter, referred to as a "perpendicular parking possible space") to which the vehicle 100 can be parked in a manner of the perpendicular parking (or the vehicle 100 can be perpendicularly parked) from the parking start position of the vehicle 100; or a space (hereinafter, referred to as a "parallel parking possible space") to which the vehicle 100 can be parked in a manner of the parallel parking (or the vehicle 100 can be parallelly parked) from the parking start position of the vehicle 100.

The perpendicular parking is a way of parking to park the vehicle 100 into a parking possible space having a long side substantially perpendicular to the vehicle longitudinal direction Dx of when the vehicle 100 is at the parking start position in such a manner that the vehicle longitudinal direction Dx becomes finally parallel to (or along) the long side when the parking is completed. In other words, the perpendicular parking possible space is a space having a long side that is substantially perpendicular to the vehicle longitudinal direction Dx of when the vehicle 100 is at the parking start position.

The parallel parking is a way of parking to park the vehicle 100 into a parking possible space having a long side substantially parallel to the vehicle longitudinal direction Dx of when the vehicle 100 is at the parking start position in such a manner that the vehicle longitudinal direction Dx becomes finally parallel to (or along) the long side when the parking is completed. In other words, the parallel parking possible space is a space having a long side that is substantially parallel to the vehicle longitudinal direction Dx of when the vehicle 100 is at the parking start position.

(Screen Display Control)

The ECU 90 displays a parking space selection screen on the touch panel display section 60 when a display condition for the parking space selection screen is determined to be satisfied. The parking space selection screen is a screen that allows the user to select/determine the target parking space/spot (i.e., a "final target parking space" to which the user wants to park the vehicle 100 using the autonomous parking control).

Figure 5A:
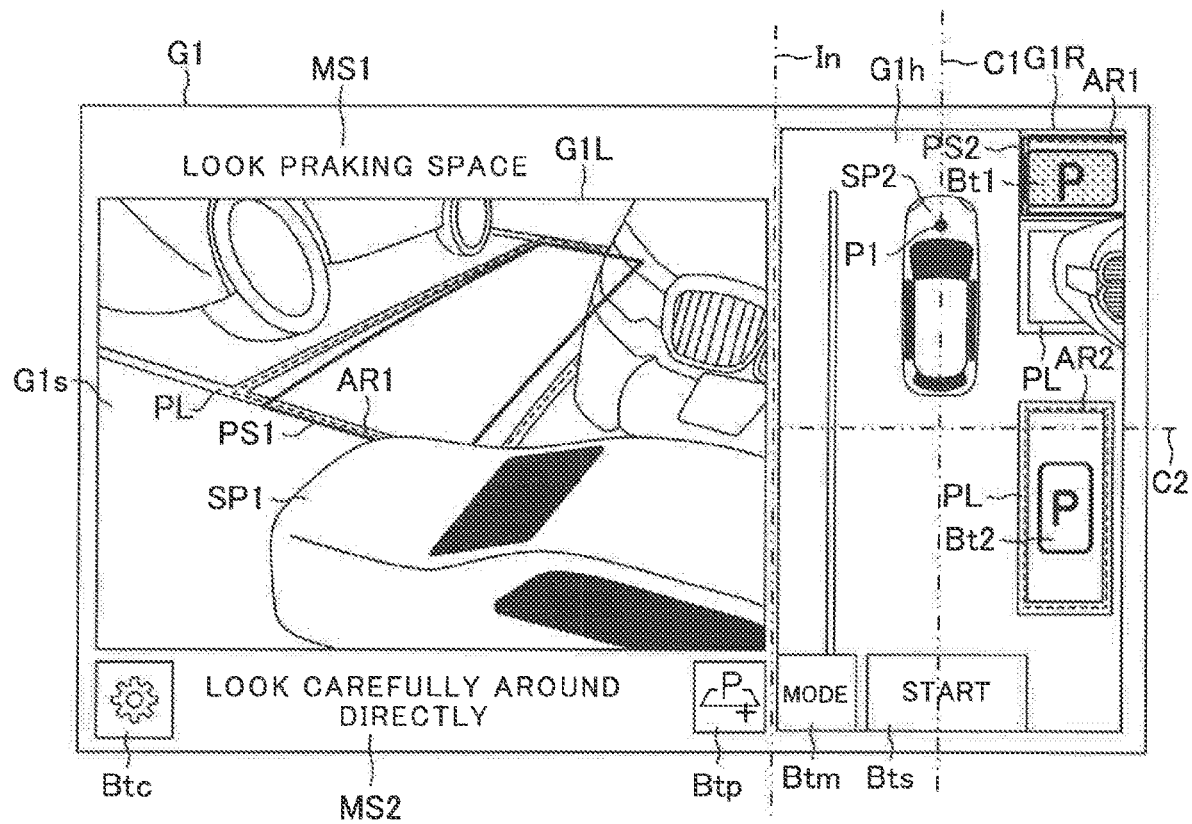
FIG. 5A shows an example of a displayed screen on a touch pane display section.

FIG. 5A shows the first parking space selection screen G1 as an example of the parking space selection screen. The first parking space selection screen G1 is a screen displayed on the touch panel display section 60 when both of a perpendicular parking possible space AR1 and a parallel parking possible space AR2 have been recognized by the ECU 90 in a case where the vehicle 100 is at the parking start position. The perpendicular parking possible space AR1 and the parallel parking possible space AR2 have been detected through the "detecting of parking possible space process" executed by the ECU 90. It should be noted that when the perpendicular parking possible space AR1 and the parallel parking possible space AR2 need not to be distinguished from each other, each of them is referred to as a "parking possible space AR", hereinafter.

The first parking space selection screen G1 is divided into a left side section (a section on the left side with respect to an imaginary line In) and a right side section (a section on the right side with respect to the imaginary line In). The left side section of the first parking space selection screen G1 includes a first left support image G1L, a registration start button Btp, a customization button Btc, a first message MS1, and a second message MS2.

The first left support image G1L includes a first specific viewpoint image G1s, a target parking space frame PS1, and the first vehicle polygon SP1. The target parking space frame PS1 and the first vehicle polygon SP1 are superimposed on the first specific viewpoint image G1s.

The first specific viewpoint image G1s is an image produced in such a manner that the parking possible space AR (in an example of FIG. 5A, the perpendicular parking possible space AR1) is displayed relatively largely (or occupy a relatively large area) in/within the first specific viewpoint image G1s. The parking possible space AR is a space that has been selected as the target parking space (or may be referred to as a "tentative target parking space") that is a space/spot (or area) to which the vehicle 100 is tentatively planned to be parked autonomously. The first specific viewpoint image G1s is preferably an image that can include/cover the whole of the (tentative) target parking space (an entire area of the perpendicular parking possible space AR1 in FIG. 5A).

The first specific viewpoint image G1s is the virtual viewpoint image. The virtual viewpoint image is produced based on a virtual viewpoint that is specified/determined based on both "a type (representing either one of the perpendicular parking possible space and the parallel parking possible space) and a position (a relative position with respect to the vehicle 100)" of the parking possible space AR that has been selected as the (tentative) target parking space. Hereinafter, the position of the parking possible space AR that has been selected as the (tentative) target parking space is referred to as a "presently-selected target parking position". The virtual viewpoint determined for the first specific viewpoint image G1s is referred to as a "specific virtual viewpoint".

When the parking possible space that has been selected as the (tentative) target parking space is the perpendicular parking possible space, the ECU 90 specifies/selects (or determines), as the specific virtual viewpoint, one out of a first to sixth virtual viewpoints, based on the presently-selected target parking position. It should be noted that the ECU 90 may use a position of the target parking space frame PS1 (or a target parking space frame PS2) in place of the presently-selected target parking position to select the specific virtual viewpoint. When the parking possible space that has been selected as the (tentative) target parking space is the parallel parking possible space, the ECU 90 specifies, as the specific virtual viewpoint, one out of a seventh to twelfth virtual viewpoints based on the presently-selected target parking position.

The ECU 90 cuts out, as image information (or an image), an "area of the curved projection surface" that is covered/encompassed within a predetermined view angle from the specific virtual viewpoint, out of the entire the curved projection surface. Furthermore, the ECU 90 superimposes "the vehicle polygon (the first vehicle polygon SP1) representing the shape of the vehicle 100 included within the predetermined view angle and viewed from the specific virtual viewpoint on the cut out image information (the cut out image). In this manner, the virtual viewpoint image information is produced. The ECU 90 produces the virtual viewpoint image based on the thus produced virtual viewpoint image information.

In this manner, one of the first to twelfth virtual viewpoint images that corresponds to the respective first to twelfth virtual viewpoints is produced. Namely, one of the first to twelfth virtual viewpoint images that corresponds to the specific virtual viewpoint is generated. Each of the first to twelfth virtual viewpoint images is an image that is viewed from a viewpoint obliquely above the vehicle 100 (a virtual viewpoint located obliquely above the vehicle 100 in the virtual 3D space). In the produced virtual viewpoint image corresponding to the specific virtual viewpoint, the parking possible space AR (the perpendicular parking possible space AR1 in the example of FIG. 5A) that has been selected as the (tentative) target parking space can be displayed relatively largely (namely, can occupy a relatively large area).

Each of the first virtual viewpoint image and the seventh virtual viewpoint image is an image viewed from a viewpoint positioned on the left front side of the vehicle 100 and obliquely above the vehicle 100. When the first virtual viewpoint is selected as the specific virtual viewpoint, the parking possible space AR that has been selected as the (tentative) target parking space can occupy a relatively large area (or can be displayed largely) in the first virtual viewpoint image. Similarly, when the seventh virtual viewpoint is selected as the specific virtual viewpoint, the parking possible space AR that has been selected as the (tentative) target parking space can occupy a relatively large area (or can be displayed largely) in the seventh virtual viewpoint image. It should be noted that the first virtual viewpoint image and the seventh virtual viewpoint image may be the same images as each other or may be different images from each other.

Figure 5B:
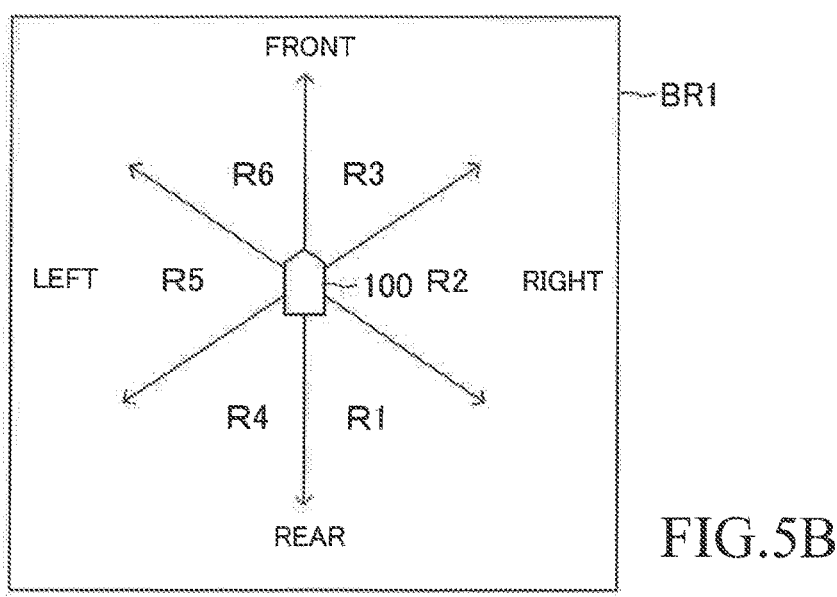
FIG. 5B shows a figure illustrating first to twelfth predetermined position ranges.

For instance, the first virtual viewpoint image or the seventh virtual viewpoint image is the image displayed as the specific viewpoint image when the presently-selected target parking position is within a first predetermined position range R1 on the right rear side of the vehicle 100 (refer to a block BR1 in FIG. 5B).

Each of the second virtual viewpoint image and the eighth virtual viewpoint image is an image viewed from a viewpoint positioned on the left side of the vehicle 100 and obliquely above the vehicle 100. When the second virtual viewpoint is selected as the specific virtual viewpoint, the parking possible space AR that has been selected as the (tentative) target parking space can occupy a relatively large area (or can be displayed largely) in the second virtual viewpoint image. Similarly, when the eighth virtual viewpoint is selected as the specific virtual viewpoint, the parking possible space AR that has been selected as the (tentative) target parking space can occupy a relatively large area (or can be displayed largely) in the eighth virtual viewpoint image. It should be noted that the second virtual viewpoint image and the eighth virtual viewpoint image may be the same images as each other or may be different images from each other.

For instance, the second virtual viewpoint image or the eighth virtual viewpoint image is the image displayed as the specific viewpoint image when the presently-selected target parking position is within a second predetermined position range R2 on the right side of the vehicle 100 (refer to the block BR1 in FIG. 5B).

Each of the third virtual viewpoint image and the ninth virtual viewpoint image is an image viewed from a viewpoint positioned on the left rear side of the vehicle 100 and obliquely above the vehicle 100. When the third virtual viewpoint is selected as the specific virtual viewpoint, the parking possible space AR that has been selected as the (tentative) target parking space can occupy a relatively large area (or can be displayed largely) in the third virtual viewpoint image. Similarly, when the ninth virtual viewpoint is selected as the specific virtual viewpoint, the parking possible space AR that has been selected as the (tentative) target parking space can occupy a relatively large area (or can be displayed largely) in the ninth virtual viewpoint image. It should be noted that the third virtual viewpoint image and the ninth virtual viewpoint image may be the same images as each other or may be different images from each other.

For instance, the third virtual viewpoint image or the ninth virtual viewpoint image is an image displayed as the specific viewpoint image when the presently-selected target parking position is within a third predetermined position range R3 on the right front side of the vehicle 100 (refer to the block BR1 in FIG. 5B).

Each of the fourth virtual viewpoint image and the tenth virtual viewpoint image is an image viewed from a viewpoint positioned on the right front side of the vehicle 100 and obliquely above the vehicle 100. When the fourth virtual viewpoint is selected as the specific virtual viewpoint, the parking possible space AR that has been selected as the (tentative) target parking space can occupy a relatively large area (or can be displayed largely) in the fourth virtual viewpoint image. Similarly, when the tenth virtual viewpoint is selected as the specific virtual viewpoint, the parking possible space AR that has been selected as the (tentative) target parking space can occupy a relatively large area (or can be displayed largely) in the tenth virtual viewpoint image. It should be noted that the fourth virtual viewpoint image and the tenth virtual viewpoint image may be the same images as each other or may be different images from each other.

For instance, the fourth virtual viewpoint image or the tenth virtual viewpoint image is an image displayed as the specific viewpoint image when the presently-selected target parking position is within a fourth predetermined position range R4 on the left rear side of the vehicle 100 (refer to the block BR1 in FIG. 5).

Each of the fifth virtual viewpoint image and the eleventh virtual viewpoint image is an image viewed from a viewpoint positioned on the right side of the vehicle 100 and obliquely above the vehicle 100. When the fifth virtual viewpoint is selected as the specific virtual viewpoint, the parking possible space AR that has been selected as the (tentative) target parking space can occupy a relatively large area (or can be displayed largely) in the fifth virtual viewpoint image. Similarly, when the eleventh virtual viewpoint is selected as the specific virtual viewpoint, the parking possible space AR that has been selected as the (tentative) target parking space can occupy a relatively large area (or can be displayed largely) in the eleventh virtual viewpoint image. It should be noted that the fifth virtual viewpoint image and the eleventh virtual viewpoint image may be the same images as each other or may be different images from each other.

For instance, the fifth virtual viewpoint image or the eleventh virtual viewpoint image is an image displayed as the specific viewpoint image when the presently-selected target parking position is within a fifth predetermined position range R5 on the left side of the vehicle 100 (refer to the block BR1 in FIG. 5).

Each of the sixth virtual viewpoint image and the twelfth virtual viewpoint image is an image viewed from a viewpoint positioned on the right rear side of the vehicle and obliquely above the vehicle. When the sixth virtual viewpoint is selected as the specific virtual viewpoint, the parking possible space AR that has been selected as the (tentative) target parking space can occupy a relatively large area (or can be displayed largely) in the sixth virtual viewpoint image. Similarly, when the twelfth virtual viewpoint is selected as the specific virtual viewpoint, the parking possible space AR that has been selected as the (tentative) target parking space can occupy a relatively large area (or can be displayed largely) in the twelfth virtual viewpoint image. It should be noted that the sixth virtual viewpoint image and the twelfth virtual viewpoint image may be the same images as each other or may be different images from each other.

For instance, the sixth virtual viewpoint image or the twelfth virtual viewpoint image is an image displayed as the specific viewpoint image when the presently-selected target parking position is within a sixth predetermined position range R6 on the left front side of the vehicle 100 (refer to the block BR1 in FIG. 5B).

It should be noted that in the example of FIG. 5A, the (tentative) target parking space is the perpendicular parking possible space AR1 and the presently-selected target parking position is within the third predetermined position range R3 located on the right front side of the vehicle 100. Thus, the first specific viewpoint image G1s that is the third virtual viewpoint image is displayed as the specific viewpoint image.

The target parking space frame PS1 is a frame line that is superimposed on the parking possible space AR that has been selected as the (tentative) target parking space within the first specific viewpoint image G1s.

The registration start button Btp is a button to be operated by the user in order to let the ECU 90 start a registration operation (a pre-registration autonomous parking control) of a memorized parking space described later.

The customization button Btc is a button to be operated by the user in order to let the ECU 90 display a customization screen. The customization screen is an operation screen that allows the user to adjust operation contents of the parking assist function.

The first message Ms1 and the second message Ms2 are messages (characters/sentences) displayed in order to present a direction of movement of the vehicle 100 to the user (or notify the user of the moving direction of the vehicle 100) and/or to assist the user to monitor the surroundings of the vehicle 100. The ECU 90 displays each of the first message Ms1 and the second message Ms2 that is appropriate for a state of the vehicle 100 based on the state of the vehicle 100.

The right side section of the first parking space selection screen G1 includes a first right support image G1R. The first right support image G1R includes a first bird's-eye view image G1h, a perpendicular parking space selection button Bt1, a parallel parking space selection button Bt2, a parking mode change button Btm, a start button Bts, and the second vehicle polygon SP2. These buttons Bt1, Bt2, Btm, and Bts, and the polygon SP2 are superimposed on the first bird's-eye view image G1h.

The first bird's-eye view image G1h is a virtual viewpoint image produced by cutting out, as the image, an "area of the above described projection surface" that is covered/encompassed within a predetermined view angle from the virtual viewpoint corresponding to a viewpoint immediately above the vehicle 100 (i.e, the virtual viewpoint located immediately above the vehicle 100 in the virtual 3D space). The second vehicle polygon SP2 is placed at a position P1 (the parking start position) of the vehicle 100 in the first bird's-eye view image G1h. The second vehicle polygon SP2 is superimposed on the position P1 that is placed on the center axis C1 in a width direction of the first right support image G1R and on a front side with respect to a center axis C2 of the first right support image G1R in a longitudinal (up-down) direction. The first bird's-eye view image G1h has the position P1 as the position of the vehicle 100 (the position P1 of the first bird's-eye view image G1h corresponds to the center part of the virtual 3D space) and is included in the first right support image G1R (within a display range of the first right support image G1R on the touch panel display section 60).

The perpendicular parking space selection button Bt1 is superimposed on a part of the perpendicular parking possible space AR1 in the first bird's-eye view image G1h. The perpendicular parking space selection button Bt1 is represented by a rectangular frame, a letter "P" placed at a center of the rectangular frame, and a background in the rectangular frame. The perpendicular parking space selection button Bt1 is displayed in such a manner that along side of the perpendicular parking space selection button Bt1 is substantially perpendicular to the longitudinal axis of the second vehicle polygon SP2.

The parallel parking space selection button Bt2 is superimposed on a part of the parallel parking possible space AR2 in the first bird's-eye view image G1h. The parallel parking space selection button Bt2 is represented by a rectangular frame, a letter "P" placed at a center of the rectangular frame, and a background in the rectangular frame. The parallel parking space selection button Bt2 is displayed in such a manner that a long side of the parallel parking space selection button Bt2 is substantially parallel to the longitudinal axis of the second vehicle polygon SP2.

Hereinafter, when the perpendicular parking space selection button Bt1 and the parallel parking space selection button Bt2 need not to be distinguished from each other, those buttons are referred to as "parking space selection buttons Bt". Each of the parking space selection buttons Bt is formed of an image.

The parking space selection button Bt displayed on the touch panel display section 60 is operated by the user when the user touches the parking space selection button Bt. Hereinafter, the operation to touch a button displayed on the touch panel display section 60 is referred as a "touch operation". Thus, performing the touch operation to the button means touching the button. The touch operation to the parking space selection button Bt generates an operation signal in response to the touch operation. The ECU 90 receives the operation signal.

The ECU 90 displays the parking space selection button Bt in either a first display mode or a second display mode. If a certain parking possible space AR is selected as the (tentative) target parking space, the ECU 90 displays the parking space selection button Bt in the first display mode (in such a manner that the parking space selection button Bt is superimposed/placed on a part of the certain parking possible space AR). If a certain parking possible spaces AR is not selected as the (tentative) target parking space, the ECU 90 displays the parking space selection button Bt in the second display mode (in such a manner that the parking space selection button Bt is superimposed/placed on the part of the certain parking possible space AR).

When the touch operation is performed to the parking space selection button Bt that has been being displayed in the second display mode (i.e., when the parking space selection button Bt that has been being displayed in the second display mode is touched), the ECU 90 selects/determines the parking possible space AR on which that touched parking space selection button Bt is superimposed as the (tentative) target parking space, and displays that touched parking space selection button Bt in the first display mode. In other words, the ECU 90 switches/changes the display modes of the parking space selection button Bt from the second display mode to the first display mode when the button Bt is touched. When the parking space selection button Bt that has been being displayed in the second display mode is touched, the ECU 90 switches/changes the display modes of the parking space selection button Bt that has been being displayed in the first display mode to the second display mode.

In the present example, the parking space selection button Bt displayed in the first display mode is different from the parking space selection button Bt displayed in the second display mode only in color of the background of the parking space selection button Bt. The color of parking space selection button Bt displayed in the first display mode is a first color (e.g., blue) and the color of parking space selection button Bt displayed in the second display mode is a second color (e.g., white) different from the first color.

The target parking space frame PS2 is formed of frame lines, and is superimposed on the parking possible space AR that has been selected as the (tentative) target parking space and that is in the first bird's-eye view image G1h. In the first parking space selection screen G1 shown in FIG. 5A, the target parking space frame PS2 is displayed so as to be superimposed on the perpendicular parking possible space AR1 that has been selected as the (tentative) target parking space.

The parking mode change button Btm is a button to be touched (a button to which the touch operation is performed) by the user in order to let the ECU 90 change autonomous parking modes from a normal autonomous parking mode to a memory autonomous parking mode. The autonomous parking mode is a mode for allowing the ECU 90 to perform the autonomous parking control. The normal autonomous parking mode is a mode for allowing the ECU 90 to perform a normal autonomous parking control as the autonomous parking control. The memory autonomous parking mode is a mode for allowing the ECU 90 to perform a post-registration autonomous parking control as the autonomous parking control.

The start button Bts is a button to be touched (a button to which the touch operation is performed) by the user in order to let the ECU 90 start to perform the normal autonomous parking control.

(Normal Autonomous Parking Control)

In the normal autonomous parking mode, when the start button Bts is touched by the user, the ECU 90 sets the final target parking space to the (tentative) target parking space (in the example of FIG. 5A, the parking possible space AR1 on which the target parking space frame PS2 (PS1) is superimposed) that has been selected up to a time point when the touch operation to the start button Bts is performed. Thereafter, the ECU 90 performs the normal autonomous parking control to autonomously move the vehicle 100 from the parking start position to the final target parking space (more specifically, to a predetermined position within the final target parking space), and then, to set the vehicle 100 in the parking state.

<Outline of Operation>

Figure 6:
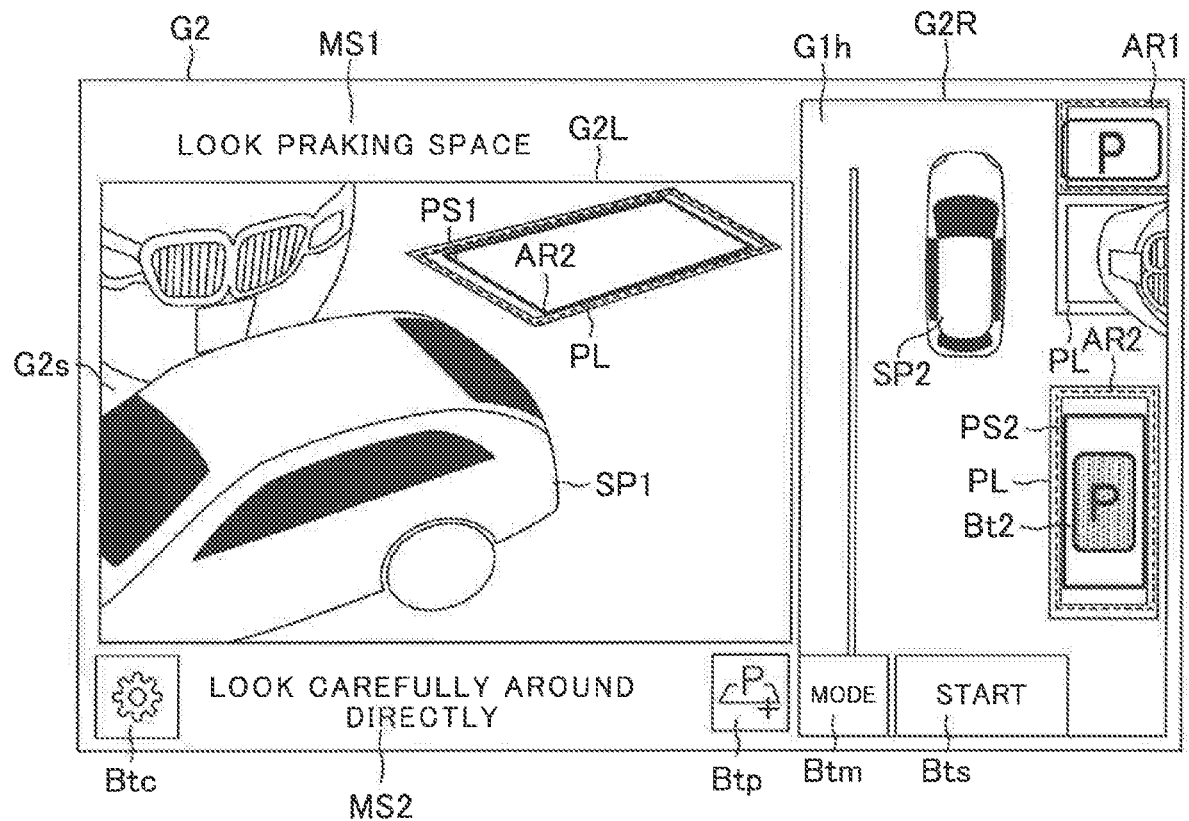
FIG. 6 shows an example of a displayed screen on the touch panel display section.

It is now assumed that the parallel parking selection button Bt2 displayed in the second display mode is touched by the user, on the first parking space selection screen G1 shown in FIG. 5A In this case, as shown in FIG. 6, the ECU 90 changes the (tentative) target parking space from the perpendicular parking possible space AR1 to the parallel parking possible space AR2 on which the parallel parking space selection button Bt2 has been superimposed. Thus, the ECU 90 changes the display modes of the touched parallel parking space selection button Bt2 from the second mode to the first display mode. Furthermore, as shown in FIG. 6, the ECU 90 moves the target parking space frame PS1 and the target parking space frame PS2 to the respective parallel parking possible spaces AR2 and superimposes the target parking space frame PS1 and the target parking space frame PS2 on the respective parallel parking possible spaces AR2.

In FIG. 6, the presently-selected target parking position is within the first predetermined position range R1 (refer to the block BR1 in FIG. 5B) that is on the right rear side of the vehicle 100. Therefore, the first virtual viewpoint image is supposed to be displayed as a second specific viewpoint image G2s that is the specific viewpoint image. Accordingly, the ECU 90 stops displaying the first left support image G1L including the first specific viewpoint image GIs (the third virtual viewpoint image) shown in FIG. 5A and instead, starts to display a second left support image G2L that includes the second specific viewpoint image G2s (the first virtual viewpoint image) shown in FIG. 6. That is, the ECU 90 replaces the first parking space selection screen G1 with a second parking space selection screen G2 that includes the second left support image G2L.

Figure 7A:
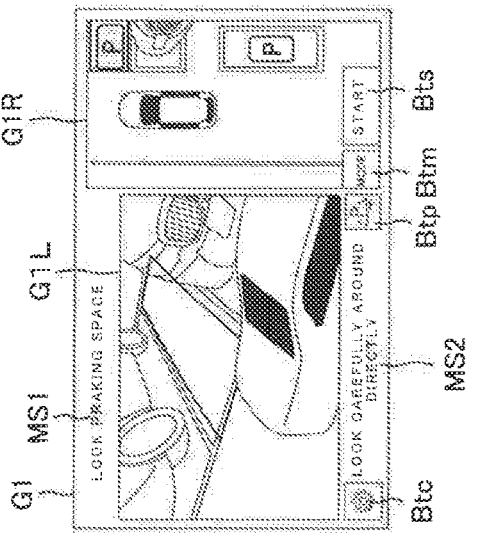
FIG. 7A shows an example of a displayed screen on the touch panel display section.
Figure 7B:
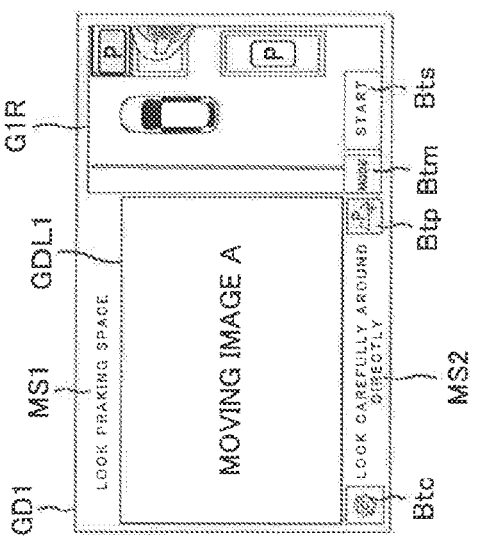
FIG. 7B shows an example of a displayed screen on the touch panel display section.
Figure 7C:
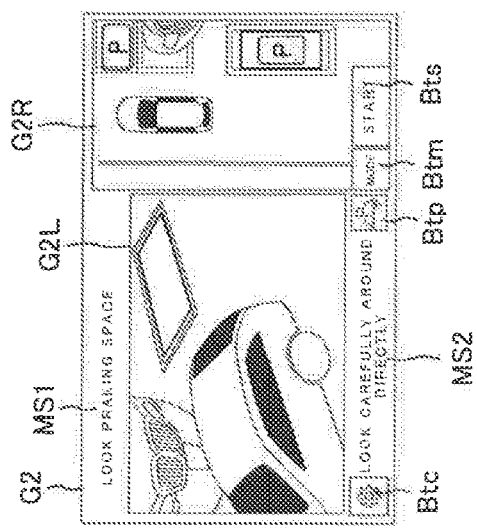
FIG. 7C shows an example of a displayed screen on the touch panel display section.

As shown in FIGS. 7A to 7C, the ECU 90 displays a first moving image screen GD1 in a period from a time point at which the first parking space selection screen G1 shown in FIG. 7A corresponding to FIG. 5A is deleted to a time point at which the second parking space selection screen G2 shown in FIG. 7C corresponding to FIG. 6 starts to be displayed. Namely, when replacing the first parking space selection screen G1 with the second parking space selection screen G2, the first moving image screen GD1 is intervened/inserted between the screen G1 and the screen G2. The first moving image screen GD1 includes a first left parking space changing moving image GDL1 including a moving image A. The moving image A includes a plurality of virtual viewpoint images that correspond to respective virtual viewpoints that move consecutively in time along a predetermined path from the third virtual viewpoint to the first virtual viewpoint, in the virtual 3D space. A plurality of the virtual viewpoint images are displayed at a predetermined frame rate in chronological order to provide the moving image A. Accordingly, for instance, the moving image A shows a scene viewed from the viewpoints that smoothly moves obliquely above the vehicle 100 from a certain point obliquely above the vehicle 100 to a different point obliquely above the vehicle 100. It should be noted, however, that the ECU 90 may replace the first parking space selection screen G1 with the second parking space selection screen G2 directly/instantly without inserting the first moving image screen GD1 (the first left parking space changing moving image GDL1) therebetween.

(Memory Autonomous Parking Function)

The memory autonomous parking function is a function to:

allow the user to store (register) a parking possible space (e.g., the parking possible space that is not defined by the line(s) defining a parking space) in advance in the parking assist apparatus 10; and let the vehicle 100 move from the parking start position to the sored parking possible space autonomously; and then, set the vehicle 100 in the parking state, through the autonomous parking control (the post-registration autonomous parking control).

The ECU 90 is configured to be capable of executing a control for realizing (achieving) the memory autonomous parking function.

(Parking Space Registration Control)

When the user wants to store in the parking assist apparatus 10 (or register) a parking space (e.g., a parking space of a home of the user), the user determines/specifies the parking space that the user wants to store in the parking assist apparatus 10 through a predetermined operation onto an operation screen displayed on the touch panel display section 60 in a state where the user has stopped the vehicle near the parking space (e.g., just beside the parking space) that the user wants to register. Hereinafter, the parking space that the user wants to store in the parking assist apparatus 10 or register is referred to as a "registration desired parking space".

After the registration desired parking space is determined/specified, the ECU 90 performs a pre-registration autonomous parking control to autonomously move the vehicle 100 from the stopped position of the vehicle 100 to the registration desired parking space, and then, set the vehicle 100 in the parking state.

The ECU 90 obtains information (parking space information) on the parking space (the registration desired parking space), when the vehicle 100 is in the stopped state before the pre-registration autonomous parking control and while the ECU 90 is performing the pre-registration autonomous parking control. When the ECU 90 has obtained the parking space information, the ECU 90 stores (registers) the obtained parking space information in the nonvolatile memory in a readable manner. In the present example, the ECU 90 is configured to be capable of registering the parking space information on each of three parking spaces.

The parking space information may include information representing features of feature points (described below) that are present in the parking space and an entrance of the parking space as well as surroundings thereof, and information on coordinate of those feature points. The feature points may include local points that are in the camera viewpoint image covering the parking space and the surroundings of the parking space, and that are distinctive from the other parts. The information representing the features of the feature points may be image brightness information (light-and-shade information) of the feature points. Note that the parking space information is not limited to the coordinate information of the feature points and the brightness information of those feature points. Namely, any information can be utilized as the parking space information, as long as the information allows/enables the ECU 90 to recognize the presence of the parking space when the vehicle 100 approaches the parking space, and allows/enables the ECU 90 to obtain the relative positional relationship between the feature points and the vehicle 100.

(Post-Registration Autonomous Parking)

In the memory autonomous parking mode, the ECU 90 recognizes the registered parking space (the memorized/stored parking space) that is present around the vehicle 100 using the registered parking space information. If the ECU 90 succeeds to recognize the registered parking space, the ECU 90 is ready to perform the post-registration autonomous parking control to autonomously move the vehicle 100 from the parking start position to the registered parking space serving as the final target parking space, and then, set the vehicle 100 in the parking state, using the parking space information on the registered parking space that has been stored in the nonvolatile memory.

<Outline of Screen Display Control>

Figure 8:
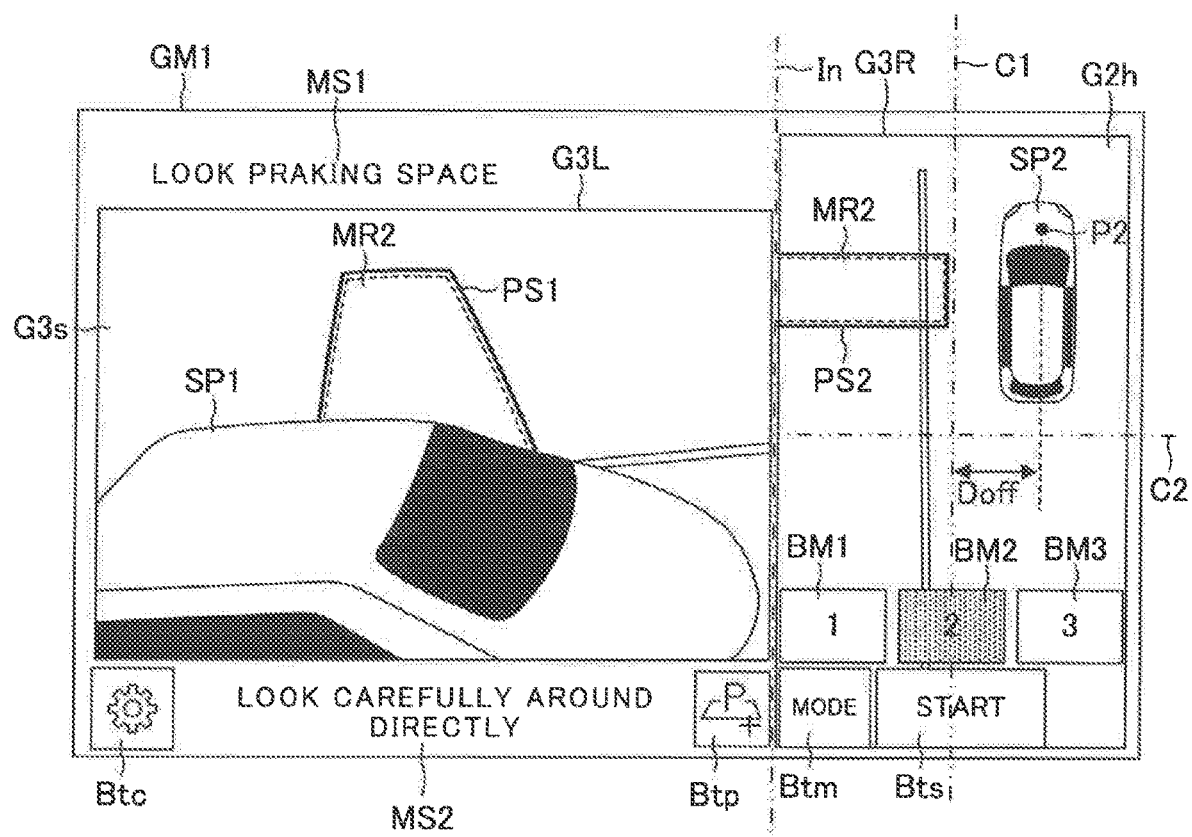
FIG. 8 shows an example of a displayed screen on the touch panel display section.

FIG. 8 shows a first memorized parking space selection screen GM1 as an example of a memorized parking space selection screen displayed on the touch panel display section 60. When a display condition for the memorized parking space selection screen is determined to be satisfied, the ECU 90 displays the memorized parking space selection screen on the touch panel display section 60. The memorized parking space selection screen GM1 is a screen (an image) that allows the user to select the target parking space out of the registered parking spaces.

As shown in FIG. 8, the first memorized parking space selection screen GM1 is divided into a left side section (a section on the left side with respect to an imaginary line In) and a right side section (a section on the right side section with respect to the imaginary line In). The left side section of the first memorized parking space selection screen GM1 includes a third left support image G3L, the first message MS1, and the second message MS2.

The third left support image G3L includes a third specific viewpoint image G3s, the target parking space frame PS1, and the first vehicle polygon SP1. The target parking space frame PS1 and the first vehicle polygon SP1 are superimposed on the third specific viewpoint image G3s. The target parking space frame PS1 is superimposed on a registered parking space MR2 that has been selected as the (tentative) target parking space. The third specific viewpoint image G3s is an image viewed from a viewpoint on the right side of the vehicle 100 and obliquely above the vehicle 100. In the third specific viewpoint image G3s, the registered parking space MR2 that has been selected as the (tentative) target parking space is displayed relatively largely (or occupy a relatively large area). Specifically, the third specific viewpoint image G3s covers an entire area of the registered parking space MR2. That is, the whole of the registered parking space MR2 is included within the display range of the third specific viewpoint image G3s on the touch panel display section 60. This allows the user to easily monitor a target alert object(s) (e.g., a pedestrian(s)) to which that the user should pay attention within the (tentative) target parking space. Therefore, the parking assist apparatus 10 can provide a function to assist the user to easily and securely monitor the target parking space.

The third specific viewpoint image G3s is also a virtual viewpoint image that is produced in the same manner as the above-described first specific viewpoint image G1s is produced. That is, the ECU 90 selects a specific virtual viewpoint out of the first to twelfth virtual viewpoints based on both the type of parking (representing either one of the perpendicular parking possible space and the parallel parking possible space) for the registered parking space MR2 and the presently-selected target parking position (the position of the registered parking space that has been selected as the (tentative) target parking space). Thereafter, the ECU 90 produces any one of the first to twelfth virtual viewpoint images, that corresponds to the selected specific virtual viewpoint. It should be noted that, in the example of FIG. 8, the type of the parking is the perpendicular parking and the presently-selected target parking position is within the fifth predetermined position range R5 that is on the left side of the vehicle 100. Thus, the fifth virtual viewpoint image is produced to be displayed as the third specific viewpoint image G3s. That is, the third specific viewpoint image G3s is the image viewed from a viewpoint on the right side of the vehicle 100 and obliquely above the vehicle 100.

The right section of the first memorized parking space selection screen GM1 includes a third right support image G3R.

The third right support image G3R includes a second bird's-eye view image G2h, first to third memorized parking space selection buttons BM1 to BM3, the parking mode change button Btm, the start button Bts, the target parking space frame PS2, and the second vehicle polygon SP2. The buttons BM1 to BM3, Btm, and Bts, the target parking space frame PS2, and the second vehicle polygon SP2 are superimposed on the second bird's-eye view image G2h. The target parking space frame PS2 is superimposed on a part of the registered parking space MR2 that has been selected as the (tentative) target parking space.

The second bird's-eye view image G2h is the virtual viewpoint image produced by cutting out, as the image, the "area of the above described projection surface" that is covered/encompassed within the predetermined view angle from the virtual viewpoint corresponding to the viewpoint immediately above the vehicle 100 (i.e, the virtual viewpoint located immediately above the vehicle 100 in the virtual 3D space). The second vehicle polygon SP2 is placed at a position (the parking start position) of the vehicle 100 in the second bird's-eye view image G2h.

In the third right support image G3R, a position P2 (the parking start position) of the second vehicle polygon SP2 (the vehicle 100) within the third right support image G3R is superimposed on a position that is shifted by a predetermined distance Doff in the right direction with respect to a center axis C1 in the width direction of the third right support image G3R and is shifted forward with respect to a center axis C2 in a longitudinal direction of the third right support image G3R. In the third right support image G3R, the second vehicle polygon SP2 (representing the vehicle 100) is placed at the position P2 (the parking start position) of the vehicle 100. The second vehicle polygon SP2 is superimposed on the position P2 that is placed at a position that is away from the center axis C1 in the right direction by the predetermined distance Doff and is shifted frontward from the center axis C2 of the third right support image G3R in the longitudinal (up-down) direction. That is, when the registered parking space MR2 is present on the left side of the vehicle 100, the position P2 (the parking start position) of the second vehicle polygon SP2 in the third right support image G3R is shifted in the right direction with respect to the center axis C1 by the predetermined distance Doff.

The second bird's-eye view image G2h covering the surroundings of the vehicle 100 is within a display range of the third right support image G3R on the touch panel display section 60. Therefore, in the second bird's-eye view image G2h, an area on the left side of the second vehicle polygon SP2 is larger than an area on the right side of the second vehicle polygon SP2. In other words, the area on the side where the target parking space is present with respect to the vehicle 100 is displayed more largely/widely than the area on the side where the target parking space is not present with respect to the vehicle 100 by the second bird's-eye view image G2h.

It should be noted that when the registered parking space is present on the right side of the vehicle 100, the position P2 (the parking start position) of the second vehicle polygon SP2 in the third right support image G3R is shifted in the left direction with respect to the center axis C1 by the predetermined distance Doff. The second bird's-eye view image G2h covering the surroundings of the vehicle 100 is within the display range of the third right support image G3R on the touch panel display section 60. Therefore, in the second bird's-eye view image G2h, an area on the right side of the second vehicle polygon SP2 is larger than an area on the left side of the second vehicle polygon SP2. In other words, the area on the side where the target parking space is present with respect to the vehicle 100 is displayed more largely/widely than the area on the side where the target parking space is not present with respect to the vehicle 100 by the second bird's-eye view image G2h.

Accordingly, the third right support image G3R including the thus produced second bird's-eye view image G2h can display the memorized parking space largely, for instance, even when there is a side walk typically having a width of about 1 m between the parking start position (the stopped position of the vehicle 100) and the memorized parking space that is either on the left side or on the right side of the vehicle 100 located at the parking start position. Namely, even if the memorized parking space is far away from the parking start position in the vehicle width direction (by a predetermined distance or longer), a large part of the memorized parking space can be included in the third right support image G3R.

Consequently, the user can more easily monitor/check a state of the registered parking space that has been selected as the (tentative) target parking space. Therefore, the parking assist apparatus 10 can improve "the function to assist the user to monitor the target parking space".

The first to third memorized parking space selection buttons BM1 to BM3 are buttons to be touched by the user in order to let the ECU 90 select the target parking space from among three registered parking spaces, each of which parking space information has already been stored/registered. In the example of FIG. 8, the registered parking space MR2 corresponding to the second memorized parking space selection button BM2 has been selected as the (tentative) target parking space. Accordingly, the second memorized parking space selection button BM2 is displayed in a display mode representing that the memorized parking space corresponding to the second memorized parking space selection button BM2 has been selected as the (tentative) target parking space.

The parking mode change button Btm is a button to be touched in order to let the ECU 90 change the autonomous parking modes from the memory parking mode to the normal autonomous parking mode.

The start button Bts is a button to be touched by the user in order to let the ECU 90 start to perform the autonomous parking control (the post-registration autonomous parking control). When the start button Bts is touched by the user, the ECU 90 sets the final target parking space to the registered parking space MR2 and performs the post-registration autonomous parking control.

(Screen Change Control of when Changing Autonomous Parking Modes)

Figure 9:
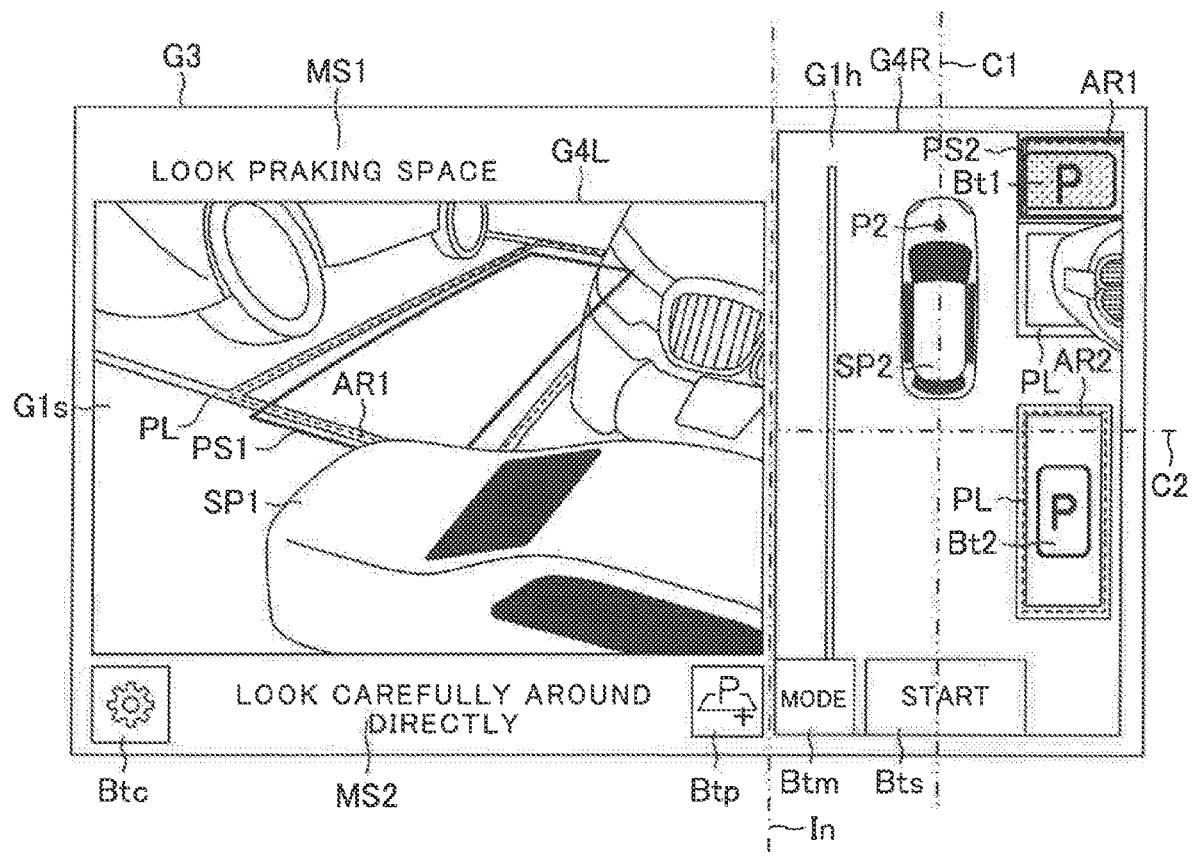
FIG. 9 shows an example of a displayed screen on the touch panel display section.

FIG. 9 shows a third parking space selection screen G3 as an example of the parking space selection screen. This third parking space selection screen G3 is a screen to be displayed when the perpendicular parking possible space AR1 and the parallel parking possible space AR2 have been recognized as a result of execution of the "detecting of parking possible space process" in a case where the vehicle 100 has been stopped at the parking start position. The third parking space selection screen G3 is displayed when the autonomous parking mode is the normal autonomous parking mode. In this example, the registered parking space MR2 (refer to FIG. 10) has also been recognized in the case where the vehicle 100 has been stopped at the parking start position. The third parking space selection screen G3 corresponds to the first parking space selection screen G1. The third parking space selection screen G3 includes a fourth left support image G4L corresponding to the first left support image G1L and a fourth right support image G4R corresponding to the first right support image G1R.

It is now assumed that the parking mode change button Btm on the third parking space selection screen G3 shown in FIG. 9 is touched. In this case, the ECU 90 changes the autonomous parking modes from the normal autonomous parking mode to the memory autonomous parking mode. Furthermore, the ECU 90 replaces the third parking space selection screen G3 shown in FIG. 9 with a second memorized parking space selection screen GM2 shown in FIG. 10. The second memorized parking space selection screen GM2 corresponds to the first memorized parking space selection screen GM1. The second memorized parking space selection screen GM2 includes a fifth left support image G5L corresponding to the third left support image G3L and a fifth right support image G5R corresponding to the third right support image G3R. As a result, the fourth left support image G4L (i.e., the third virtual viewpoint image) is replaced with the fifth left support image G5L (i.e., the fifth virtual viewpoint image), and the fourth right support image G4R is replaced with the fifth right support image G5R.

Figure 10:
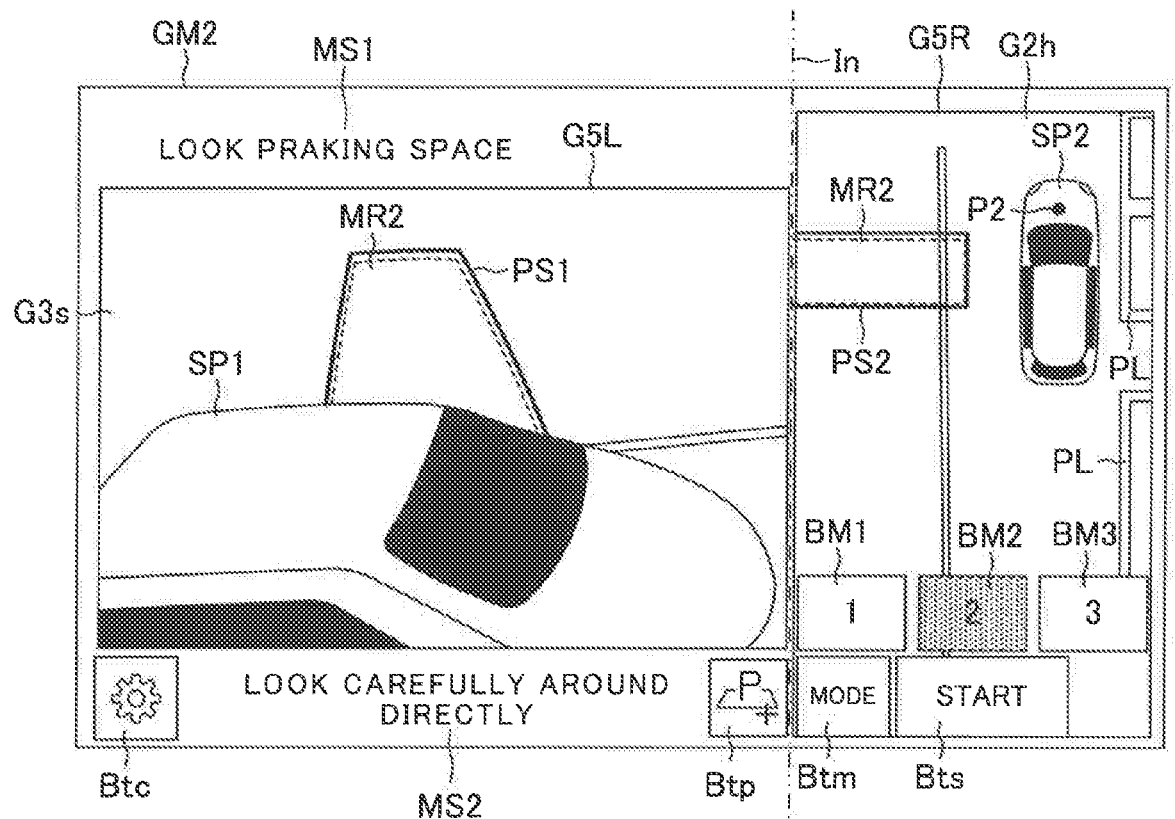
FIG. 10 shows an example of a displayed screen on the touch panel display section.
Figure 11C:
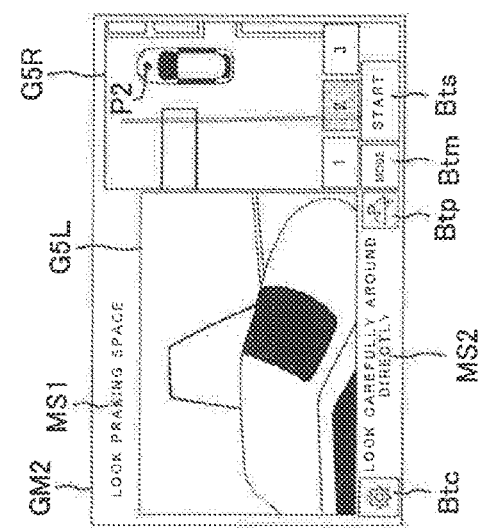
FIG. 11C shows an example of a displayed screen on the touch panel display section.
Figure 11B:
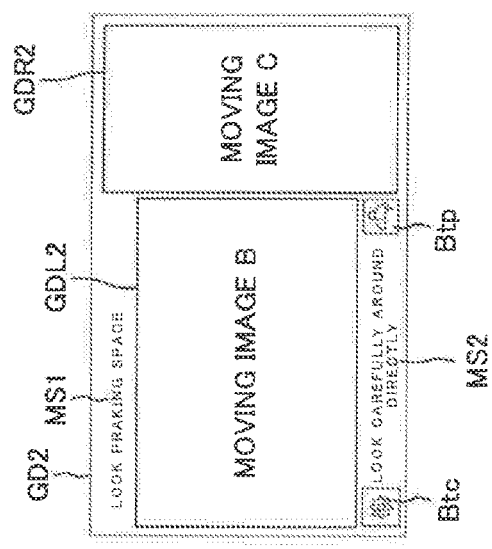
FIG. 11B shows an example of a displayed screen on the touch panel display section.
Figure 11A:
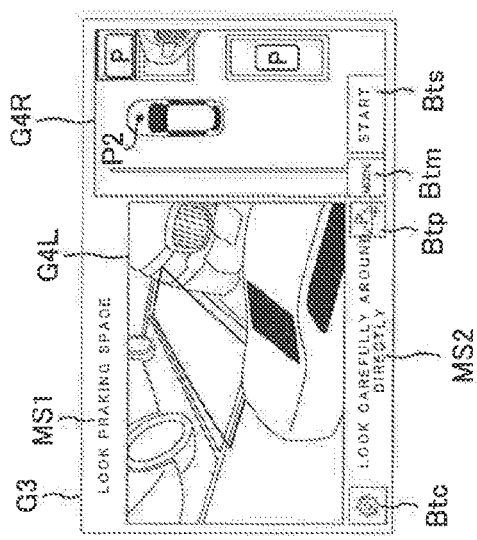
FIG. 11A shows an example of a displayed screen on the touch panel display section.

As shown in FIGS. 11A to 11C, the ECU 90 displays a second moving image screen GD2 in a period from a time point at which the third parking space selection screen G3 shown in FIG. 11A corresponding to FIG. 9 is deleted to a time point at which the second memorized parking space selection screen GM2 shown in FIG. 11C corresponding to FIG. 10 starts to be displayed. Namely, when replacing the third parking space selection screen G3 with the second memorized parking space selection screen GM2, the second moving image screen GD2 is intervened/inserted between the screen G3 and the screen GM2. The second moving image screen GD2 includes a second left parking space changing moving image GDL2 including a moving image B and a right parking space changing moving image GDR2 including a moving image C. It should be noted that the second moving image screen GD2 may include only one of the second left parking space changing moving image GDL2 and the right parking space changing moving image GDR2. The moving image B includes a plurality of virtual viewpoint images that correspond to respective virtual viewpoints that move consecutively in time along a predetermined path from the third virtual viewpoint to the fifth virtual viewpoint, in the virtual 3D space A plurality of the virtual viewpoint images are displayed at a predetermined frame rate in chronological order to provide the moving image B. Accordingly, for instance, the moving image B also shows a scene viewed from the viewpoints that smoothly moves obliquely above the vehicle 100 from a certain point obliquely above the vehicle 100 to a different point obliquely above the vehicle 100.

The moving image C includes a plurality of the bird's-eye view images of the vehicle 100, that are similar to the first bird's-eye view images G1h included in the GR4 shown in FIG. 9 and G2h included in the GR5 shown in FIG. 10. Each of the bird's-eye view images of the vehicle 100 forming the moving image C includes the position P2 of the second vehicle polygon SP2. The position P2 in one of the bird's-eye view images forming the moving image C is shifted/moved by a predetermined distance in the right direction with respect to the center axis C1 from another of the bird's-eye view images forming the moving image C that is previously displayed, so that the position P2 is moved in the moving image C toward right by the predetermined distance Doff from the center axis C1. The bird's-eye view images of the vehicle 100 forming the moving image Care switched (displayed) at the predetermined frame rate. In this manner, the moving image C displayed while the autonomous parking modes is switched from the normal autonomous parking mode to the memory autonomous parking mode is formed of the bird's-eye view images of the vehicle 100 in which the position P2 is moved toward right or left direction. It should be noted, however, that the ECU 90 may replace the third parking space selection screen G3 with the second memorized parking space selection screen GM2 directly/instantly without inserting the second moving image screen GD2 therebetween. That is, the ECU 90 may replace the fourth left support image G4L with the fifth left support image G5L directly without displaying the second left parking space changing moving image GDL2, and/or the ECU 90 may replace the fourth right support image G4R with the fifth right support image G5R directly without displaying the right parking space changing moving image GDR2.

It should be noted that when the parking mode is changed from the memory autonomous parking mode to the normal autonomous parking mode, the screen change control (the control to replace the second memorized parking space selection screen GM2 with the third parking space selection screen G3) opposite (in time) to the above-mentioned screen change control is performed.

<Specific Operation>

Figure 12:
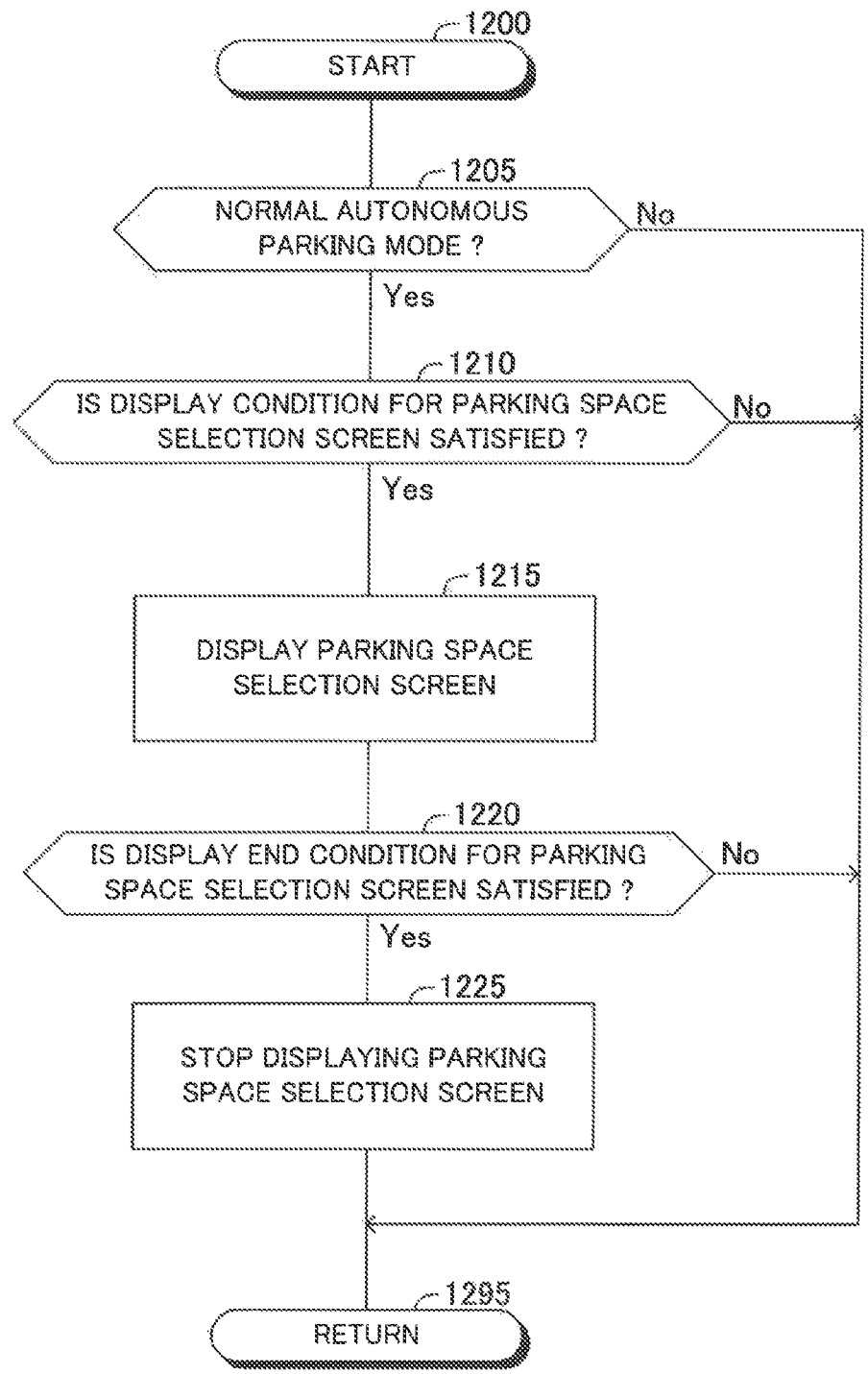
FIG. 12 is a flowchart representing a routine executed by a CPU of an ECU shown in FIG. 1.

The CPU of the ECU 90 is configured to execute a routine shown by a flowchart in FIG. 12, every time a predetermined time elapses.

Therefore, at an appropriate time point, the CPU starts processing of step 1200 and proceeds to step 1205 so as to determine whether or not the autonomous parking mode is the normal autonomous parking mode.

When the autonomous parking mode is not the normal autonomous parking mode, the CPU makes a "No" determination at step 1205 and proceeds to step 1295 so as to terminate the present routine tentatively. In contrast, when the autonomous parking mode is the normal autonomous parking mode, the CPU makes a "Yes" determination at step 1205 and proceeds to step 1210 to determine whether or not the display condition for the parking space selection screen is satisfied. It should be noted that the display condition for the parking space selection screen is a condition that is to be satisfied to start to display the parking space selection screen at an appropriate timing.

When the display condition for the parking space selection screen is not satisfied, the CPU makes a "No" determination at step 1210 and proceeds to step 1295 so as to terminate the present routine tentatively. In contrast, the display condition for the parking space selection screen is satisfied, the CPU makes a "Yes" determination at step 1210 and proceeds to step 1215 to display the parking space selection screen on the touch panel display section 60. Thereafter, the CPU proceeds to step 1220.

At step 1220, the CPU determines whether or not a display end condition for the parking space selection screen is satisfied. It should be noted that the display end condition for the parking space selection screen is a condition that is to be satisfied to stop displaying the parking space selection screen at an appropriate timing.

When the display end condition for the parking space selection screen is not satisfied, the CPU makes a "No" determination at step 1220 and proceeds to step 1295 so as to terminate the present routine tentatively. In contrast, when the display end condition for the parking space selection screen is satisfied, the CPU makes a "Yes" determination at step 1220 and proceeds to step 1225 so as to stop displaying the parking space selection screen.

Figure 13:
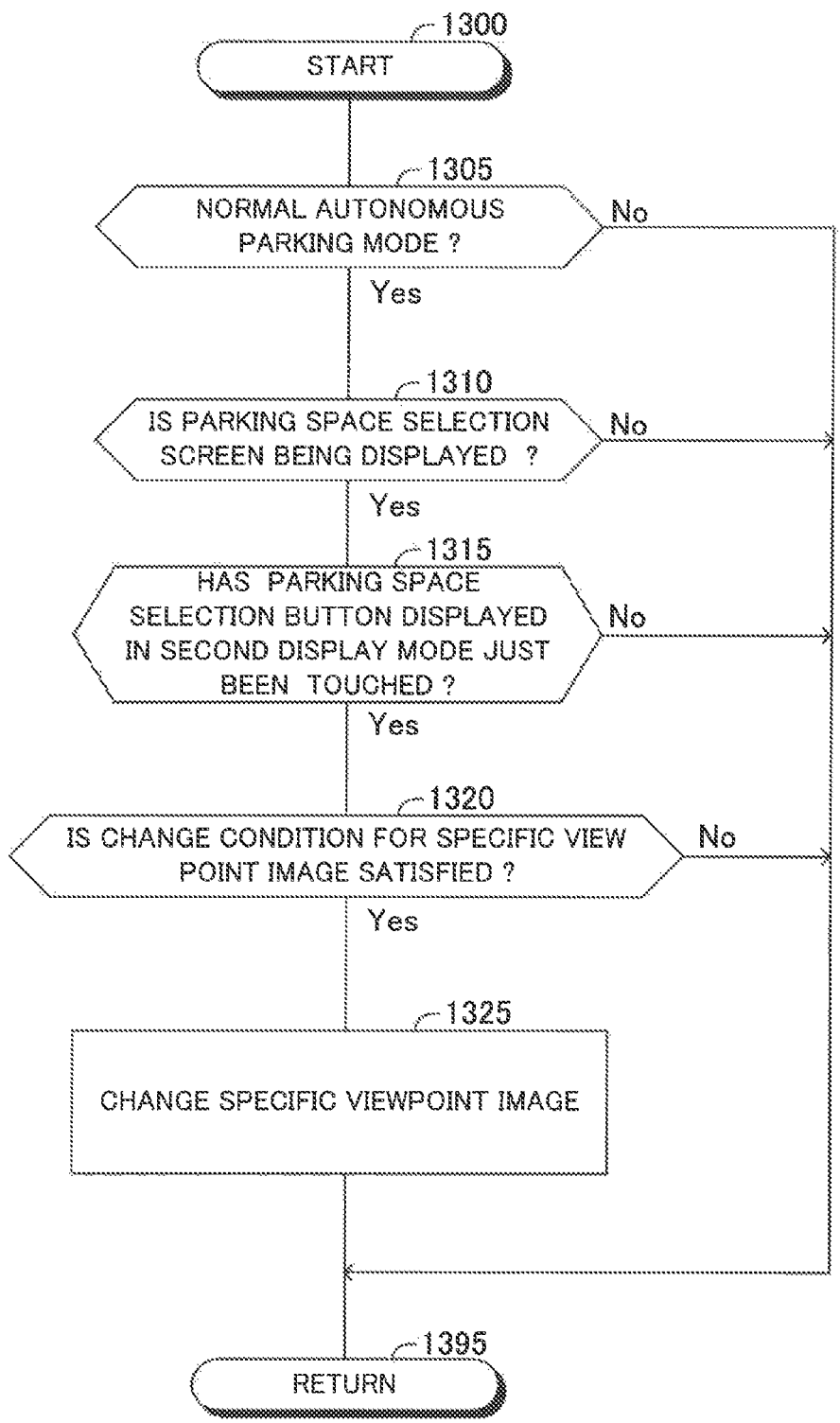
FIG. 13 is a flowchart representing a routine executed by the CPU of the ECU shown in FIG. 1.

The CPU is configured to execute a routine shown by a flowchart in FIG. 13, every time the predetermined time elapses. Therefore, at an appropriate time point, the CPU starts processing of step 1300 in FIG. 13 and proceeds to step 1305 so as to determine whether or not the autonomous parking mode is the normal autonomous parking mode.

When the autonomous parking mode is not the normal autonomous parking mode, the CPU makes a "No" determination at step 1305 and proceeds to step 1395 so as to terminate the present routine tentatively. In contrast, when the autonomous parking mode is the normal autonomous parking mode, the CPU makes a "Yes" determination at step 1305 and proceeds to step 1310 so as to determine whether or not the parking space selection screen is being displayed.

When the parking selection screen is not being displayed, the CPU makes a "No" determination at step 1310 and proceeds to step 1395 so as to terminate the present routine tentatively. In contrast, when the parking space selection screen is being displayed, the CPU makes a "Yes" determination at step 1310 and proceeds to step 1315 so as to determine whether or not the parking space selection button Bt displayed in the second mode has just been touched.

When the parking space selection button Bt displayed in the second mode is not determined to have just been touched, the CPU makes a "No" determination at step 1315 and proceeds to step 1395 so as to terminate the present routine tentatively.

When the parking space selection button Bt displayed in the second mode has just been touched, the CPU makes a "Yes" determination at step 1315 and proceeds to step 1320 so as to determine whether or not a change condition for the specific viewpoint image is satisfied. The change condition for the specific viewpoint image is a condition that is to be satisfied when the "position range among the ranges R1 to R6 (refer to FIG. 5B)" to which the presently-selected target parking position belongs has changed to another position range among the ranges R1 to R6. For instance, the change condition for the specific viewpoint image is satisfied when the presently-selected target parking position has moved from a position within the first predetermined position range R1 to a position within the sixth predetermined position range R6.

When the change condition for the virtual viewpoint image is satisfied, the CPU makes a "Yes" determination at step 1320 and proceeds to step 1325 so as to change the virtual viewpoint image that is displayed at the present time point to any one of the first to sixth virtual viewpoint images that corresponds to the position range to which the presently-selected target parking position belongs. Thereafter, the CPU proceeds to step 1395 to terminate the present routine tentatively.

Figure 14:
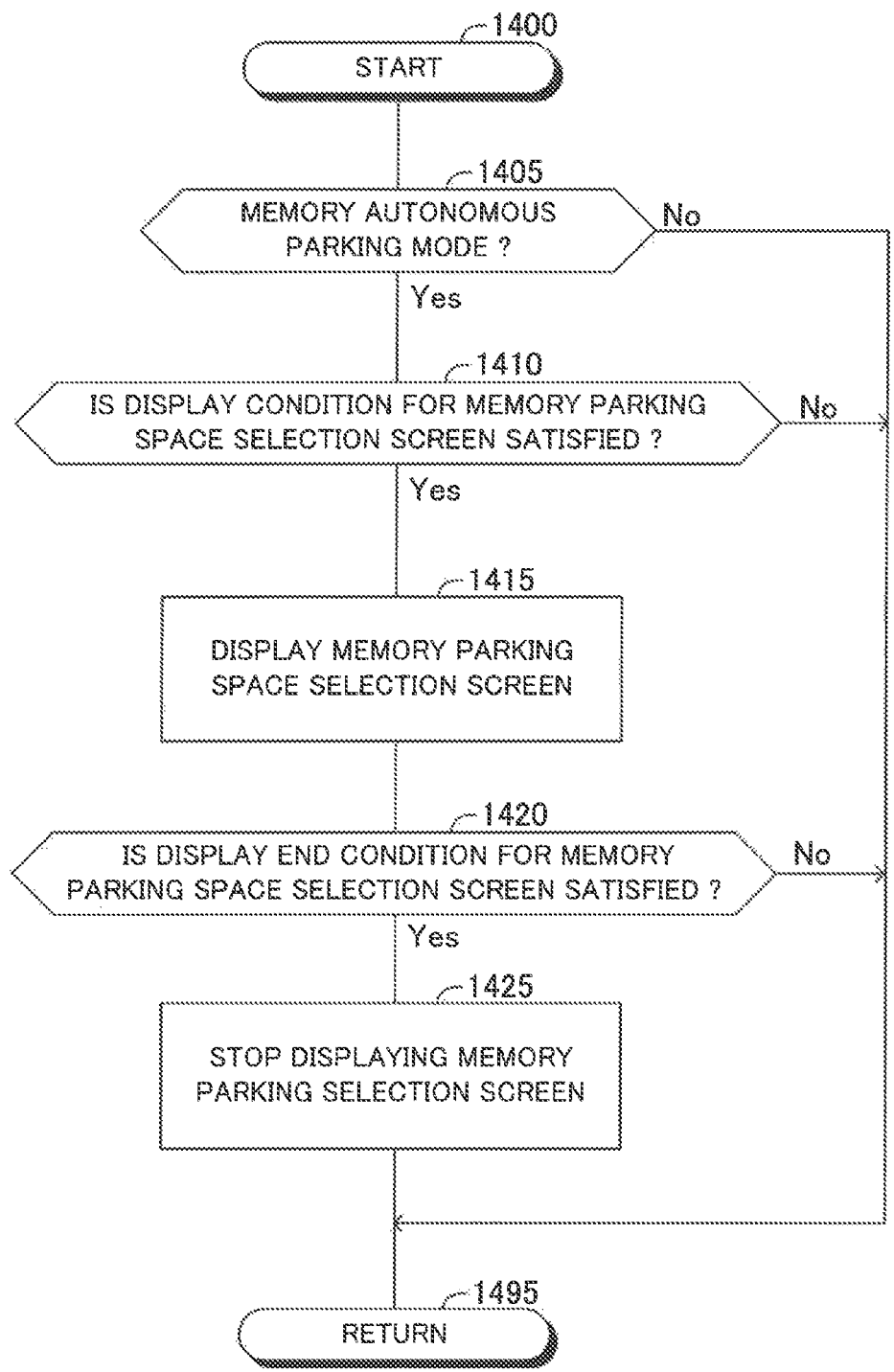
FIG. 14 is a flowchart representing a routine executed by the CPU of the ECU shown in FIG. 1.

The CPU is configured to execute a routine shown by a flowchart in FIG. 14, every time the predetermined time elapses. Therefore, at an appropriate time point, the CPU starts processing of step 1400 shown in FIG. 14 and proceeds to step 1405 so as to determine whether or not the autonomous parking mode is the memory autonomous parking mode.

When the autonomous parking mode is not the memory autonomous parking mode, the CPU makes a "No" determination at step 1405 and proceeds to step 1495 so as to terminate the present routine tentatively. In contrast, when the autonomous parking mode is the memory autonomous parking mode, the CPU makes a "Yes" determination at step 1405 and proceeds to step 1410 so as to determine whether or not the display condition for the memorized parking space selection screen is satisfied. It should be noted that the display condition for the memorized parking space selection screen is a condition that is to be satisfied to start to display the memorized parking space selection image at an appropriate timing.

When the display condition for the memorized parking space selection screen is not satisfied, the CPU makes a "No" determination at step 1410 and proceeds to step 1495 so as to terminate the present routine tentatively. In contrast, when the display condition for the memorized parking space selection screen is satisfied, the CPU makes a "Yes" determination at step 1410 and proceeds to step 1415 so as to display the memorized parking space selection screen on the touch panel display section 60. Thereafter, the CPU proceeds to step 1420.

At step 1420, the CPU determines whether or not the display end condition for the memorized parking space selection screen is satisfied. It should be noted that the display end condition for the memorized parking space selection screen is a condition that is to be satisfied stop displaying the memorized parking space selection screen at an appropriate timing.

When the display end condition for the memory parking selection screen is not satisfied, the CPU makes a "No" determination at step 1420 and proceeds to step 1495 so as to terminate the present routine tentatively. In contrast, when the display end condition for the memorized parking space selection screen is satisfied, the CPU makes a "Yes" determination at step 1420 and proceeds to step 1425 so as to stop displaying the memorized parking space selection screen. Thereafter, the CPU proceeds to step 1495 to terminate the present routine tentatively.

Figure 15:
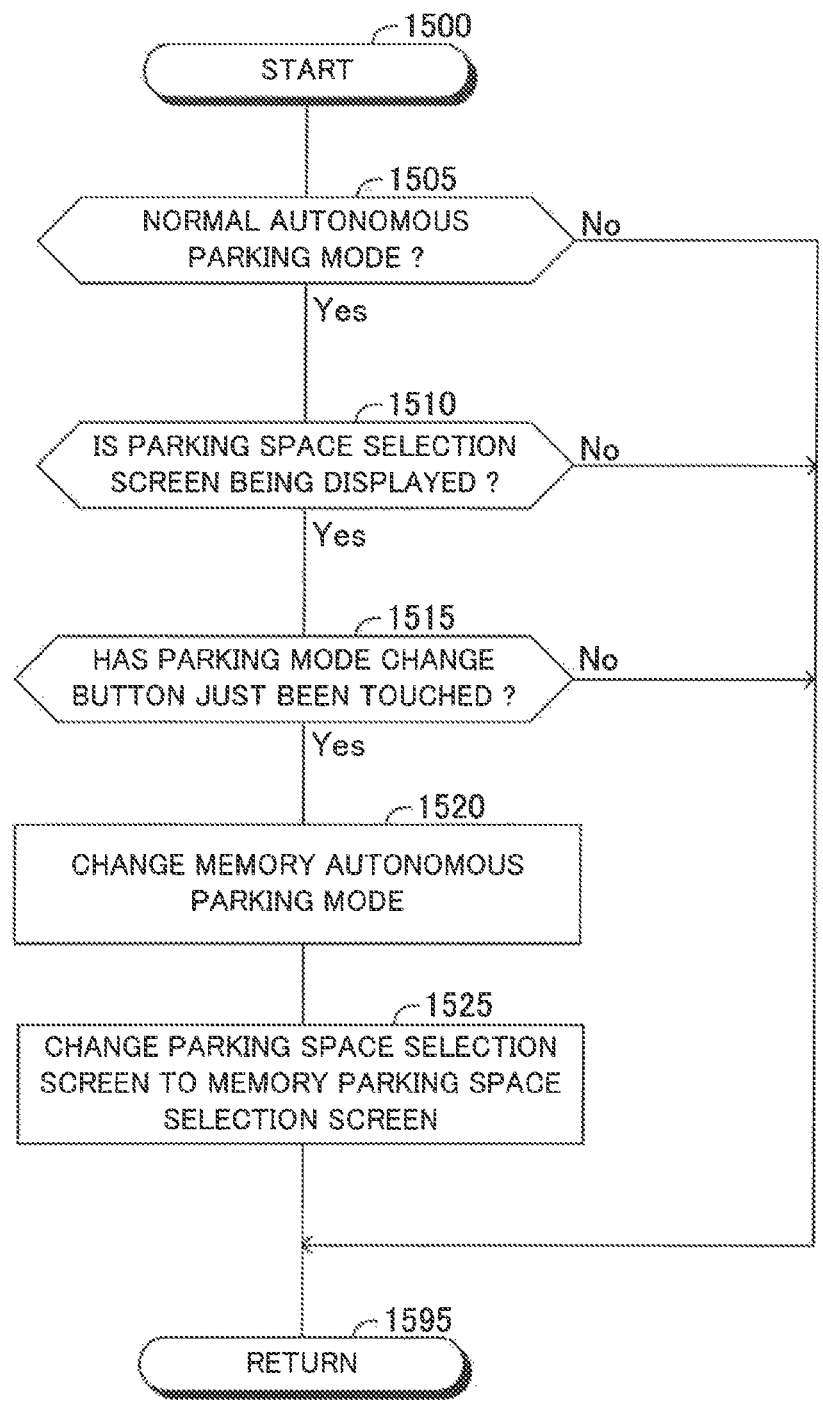
FIG. 15 is a flowchart representing a routine executed by the CPU of the ECU shown in FIG. 1.

The CPU is configured to execute a routine shown by a flowchart in FIG. 15, every time the predetermined time elapses. Therefore, at an appropriate time point, the CPU starts processing of step 1500 shown in FIG. 15 and proceeds to step 1505 so as to determine whether or not the autonomous parking mode is the normal autonomous parking mode.

When the autonomous parking mode is not the normal autonomous parking mode, the CPU makes a "No" determination at step 1505 and proceeds to step 1595 so as to terminate the present routine tentatively. In contrast, when the autonomous parking mode is the normal autonomous parking mode, the CPU makes a "Yes" determination at step 1505 and proceeds to step 1510 so as to determine whether or not the parking space selection image is being displayed.

When the parking space selection image is not being displayed, the CPU makes a "No" determination at step 1510 and proceeds to step 1595 so as to terminate the present routine tentatively. In contrast, when the parking space selection screen is being displayed, the CPU makes a "Yes" determination at step 1510 and proceeds to step 1515 so as to determine whether or not the parking mode change button Btm has just been touched.

When the parking mode change button Btm is not determined to have just been touched, the CPU makes a "No" determination at step 1515 and proceeds to step 1595 so as to terminate the present routine tentatively. In contrast, when the parking mode change button Btm is determined to have just been touched, the CPU makes a "Yes" determination at step 1515, executes processes of steps 1520 and 1525 described below. Thereafter, the CPU proceeds to step 1595 to terminate the present routine tentatively.

Step 1520: the CPU changes the autonomous parking modes from the autonomous parking mode to the memory parking mode.

Step 1525: the CPU changes the parking space selection screen to the memorized parking space selection screen.

As has been described above, the parking assist apparatus 10 can improve "the function to assist the user to monitor the target parking space".

The present disclosure is not limited to the above embodiment and can employ various modifications within the scope of the present disclosure.

For instance, when there are two or three memorized parking spaces that the ECU 90 can recognize from the same parking start position, the user can select one out of them as the parking space to park the vehicle 100 by operating the memorized parking space selection button in the memorized parking space selection screen. In this case, when one predetermined position range to which the presently-selected target parking position belongs has changed to another predetermined position range, the ECU 90 may perform the screen change control to change one specific viewpoint image corresponding to one predetermined position range to another specific viewpoint image corresponding to the other predetermined position range.

For instance, in the above embodiment, the button formed by the image may be replaced with a physical button. In this case, the touch panel display section 60 may be another type of display other than the touch panel type display.

What is claimed is:

1. A parking assist apparatus, installed on a vehicle and configured to be capable of performing an autonomous parking control to move said vehicle from a parking start position to a final target parking space so that said vehicle is parked in said final target parking space, comprising:
a camera device configured to capture images around said vehicle to obtain image information;
a display; and
a control unit configured to:

specify, based on said image information, one or more of parking possible spaces each of which is a space to which said vehicle can be moved to be parked from said parking start position owing to said autonomous parking control;

produce a virtual viewpoint image of surroundings of said vehicle viewed from a virtual viewpoint located obliquely above said vehicle, based on said image information; and display, on a first predetermined image display area of said display, a first surrounding image that includes said virtual viewpoint image and a first target parking space frame in such a manner that said first target parking space frame is superimposed on a tentative target parking space within said virtual viewpoint image, said tentative target parking space being one of said parking possible spaces that has been tentatively selected as said final target parking space, wherein, said control unit is configured to:

specify said virtual viewpoint for producing said virtual viewpoint image from predetermined virtual viewpoints, based on a relative position of said tentative target parking space with respect to said vehicle, so that an entire area of said tentative target parking space is displayed within said first predetermined image display area, further produce a bird's-eye view image of surroundings of said vehicle viewed from a virtual viewpoint located immediately above said vehicle, based on said image information;

display, on a second predetermined image display area of said display, a second surrounding image that includes said bird's-eye view image and a second target parking space frame in such a manner that said second target parking space frame is superimposed on said tentative target parking space within said bird's-eye view image; and when said tentative target parking space is switched to from one of said target parking possible spaces to another of said target parking possible spaces, execute a display change control to:

produce said bird's-eye view image so that a center position of said vehicle is located at a center in a width direction of said bird's-eye view image; and shift said center of said bird's-eye view image in said width direction of said bird's-eye view image based on said relative position so that said tentative target parking space is displayed more largely.

2. The parking assist apparatus according to claim 1, wherein, said control unit is configured to be capable of performing any one of a memory autonomous parking mode and a normal autonomous parking mode selectively, as an autonomous parking mode that allows said control unit to perform said autonomous parking control; and wherein, said control unit is configured to be capable of executing said display change control when said autonomous parking mode is said memory autonomous parking mode.

3. The parking assist apparatus according to claim 2, wherein, said control unit is configured to execute said display change control when said autonomous parking mode changes from said normal autonomous parking mode to said memory autonomous parking mode.

4. The parking assist apparatus according to claim 1, wherein, said control unit is configured to:

produce a moving image composed of consecutive bird's-eye view images that are displayed consecutively in time; and intervene said moving image between said second surrounding image before said execution of said display change control and said second surrounding image after said execution of said display change control.

* * * * *